(12) United States Patent
Alrahaili

(10) Patent No.: US 11,973,910 B2
(45) Date of Patent: Apr. 30, 2024

(54) SYSTEM, APPARATUS, METHOD AND COMPUTER PROGRAM PRODUCT TO SET UP A REQUEST FOR, GENERATE, RECEIVE AND SEND OFFICIAL COMMUNICATIONS

(71) Applicant: Musaed Ruzeg N. Alrahaili, Jeddah (SA)

(72) Inventor: Musaed Ruzeg N. Alrahaili, Jeddah (SA)

( * ) Notice: Subject to any disclaimer, the term of this patent is extended or adjusted under 35 U.S.C. 154(b) by 127 days.

(21) Appl. No.: 17/446,761

(22) Filed: Sep. 2, 2021

(65) Prior Publication Data
US 2021/0400161 A1    Dec. 23, 2021

Related U.S. Application Data

(63) Continuation-in-part of application No. 14/988,523, filed on Jan. 5, 2016, now abandoned.

(51) Int. Cl.
| | |
|---|---|
| *G06F 17/00* | (2019.01) |
| *G06F 16/93* | (2019.01) |
| *G06F 21/60* | (2013.01) |
| *G06F 40/186* | (2020.01) |
| *H04N 1/00* | (2006.01) |

(52) U.S. Cl.
CPC ......... *H04N 1/00838* (2013.01); *G06F 16/93* (2019.01); *G06F 21/608* (2013.01); *G06F 40/186* (2020.01)

(58) Field of Classification Search
CPC ... H04N 1/00838; G06F 16/93; G06F 40/186; G06F 21/608; G06F 21/64
USPC ........................................ 715/234, 200, 255
See application file for complete search history.

(56) References Cited

U.S. PATENT DOCUMENTS

| | | | |
|---|---|---|---|
| 5,315,504 A | * | 5/1994 | Lemble .................. G06Q 10/10 715/234 |
| 5,913,212 A | | 6/1999 | Sutcliffe et al. |
| 5,924,109 A | | 7/1999 | Ackerman et al. |
| 6,173,276 B1 | | 1/2001 | Kant et al. |
| 6,587,746 B1 | | 7/2003 | D'Souza |
| 7,178,104 B1 | | 2/2007 | Harry et al. |
| 7,734,925 B2 | | 6/2010 | Ross et al. |
| 7,802,175 B2 | | 9/2010 | Wagner et al. |
| 8,037,018 B2 | | 10/2011 | Waldo et al. |

(Continued)

FOREIGN PATENT DOCUMENTS

| | | |
|---|---|---|
| CN | 203935003 U | 11/2014 |
| DE | 10246649 B4 | 4/2013 |
| WO | 2007053047 A1 | 5/2007 |

*Primary Examiner* — Manglesh M Patel
(74) *Attorney, Agent, or Firm* — Shumaker, Loop & Kendrick, LLP; James D. Miller

(57) ABSTRACT

A communication system, apparatus, method and computer program product can comprise or operate an input opening or slot to receive an input request, a display, an input device to receive key inputs for the input request, a scanner to generate a soft copy of the input request, a controller to process the input request and provide an output reply, a printer to print a first hard copy of the output reply and a second hard copy of the output reply, an output opening or slot to dispense the first hard copy of the output reply, and a plurality of bins to store the second hard copy of the output reply. The system is configured to manage official communications between a first user who creates an input request and a second user who creates a reply request.

18 Claims, 20 Drawing Sheets

(56) References Cited

U.S. PATENT DOCUMENTS

| | | |
|---|---|---|
| 9,224,132 B1 | 12/2015 | Knox et al. |
| 10,733,178 B2 * | 8/2020 | Alroqaie .................. G06F 16/93 |
| 2001/0034738 A1 * | 10/2001 | Cantwell ................. G06Q 10/10 |
| | | 715/255 |
| 2002/0010667 A1 | 1/2002 | Kant et al. |
| 2003/0034999 A1 | 2/2003 | Coughlin, III et al. |
| 2003/0182304 A1 * | 9/2003 | Summerlin ........... G06F 16/951 |
| | | 707/999.102 |
| 2003/0229452 A1 | 12/2003 | Lewis et al. |
| 2004/0044949 A1 | 3/2004 | Rowe |
| 2005/0050442 A1 | 3/2005 | Pope et al. |
| 2005/0092827 A1 | 5/2005 | Cimino |
| 2005/0155016 A1 | 7/2005 | Bender |
| 2006/0059107 A1 | 3/2006 | Elmore et al. |
| 2006/0277483 A1 | 12/2006 | Yamamoto |
| 2007/0061578 A1 | 3/2007 | Dhalla et al. |
| 2007/0094593 A1 | 4/2007 | Wagner et al. |
| 2007/0172062 A1 | 7/2007 | Waldo et al. |
| 2007/0288327 A1 | 12/2007 | Pulnikova |
| 2008/0098292 A1 * | 4/2008 | Embry .................. G06F 40/174 |
| | | 715/224 |
| 2008/0141330 A1 | 6/2008 | Charles et al. |
| 2008/0319804 A1 | 12/2008 | Pulnikova |
| 2009/0185713 A1 * | 7/2009 | Koike .................. G06F 21/608 |
| | | 382/100 |
| 2010/0070562 A1 | 3/2010 | Boyer et al. |
| 2010/0306059 A1 | 12/2010 | Rettig et al. |
| 2010/0332973 A1 * | 12/2010 | Kloiber ................. G06F 16/958 |
| | | 715/255 |
| 2011/0276875 A1 | 11/2011 | McCabe et al. |
| 2011/0283177 A1 | 11/2011 | Gates et al. |
| 2011/0314371 A1 | 12/2011 | Petereson et al. |
| 2012/0173962 A1 | 7/2012 | Oh et al. |
| 2012/0233205 A1 | 9/2012 | McDermott |
| 2013/0182974 A1 | 7/2013 | Smith et al. |
| 2013/0219451 A1 * | 8/2013 | Chaudhury ............. G06F 21/60 |
| | | 726/1 |
| 2013/0290183 A1 | 10/2013 | Gustin et al. |
| 2014/0006962 A1 | 1/2014 | Gu et al. |
| 2014/0033327 A1 | 1/2014 | Conte |
| 2014/0095637 A1 | 4/2014 | Cropper et al. |
| 2014/0129914 A1 * | 5/2014 | Agarwal ................ G06F 40/174 |
| | | 715/226 |
| 2014/0379633 A1 * | 12/2014 | Banas .................... G06F 16/93 |
| | | 707/608 |
| 2015/0143248 A1 | 5/2015 | Beechuk et al. |
| 2015/0212997 A1 * | 7/2015 | Kassim ................. G06Q 50/18 |
| | | 715/226 |
| 2015/0248392 A1 | 9/2015 | Watanabe |
| 2015/0248393 A1 | 9/2015 | Watanabe |
| 2016/0063421 A1 * | 3/2016 | Singh ............... G06Q 10/06316 |
| | | 705/7.26 |
| 2016/0196248 A1 * | 7/2016 | Alrahaili ................ G06F 21/64 |
| | | 715/234 |
| 2016/0253303 A1 * | 9/2016 | Pennington ........... G06F 40/174 |
| | | 715/226 |

\* cited by examiner

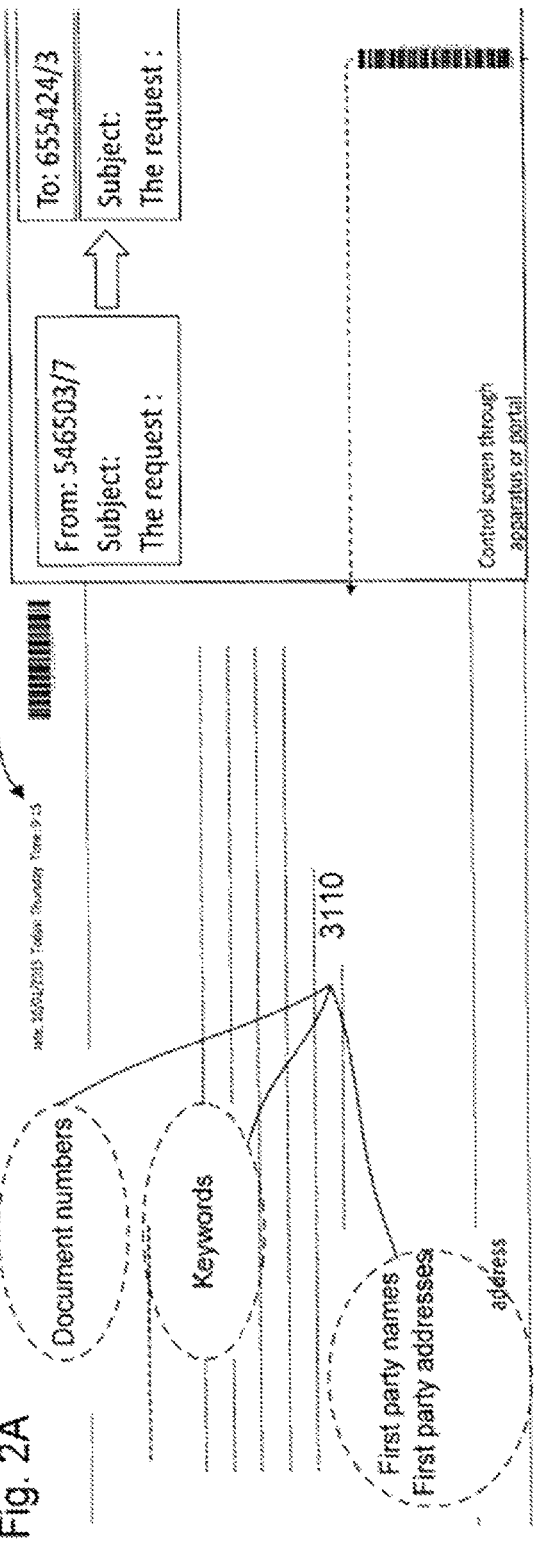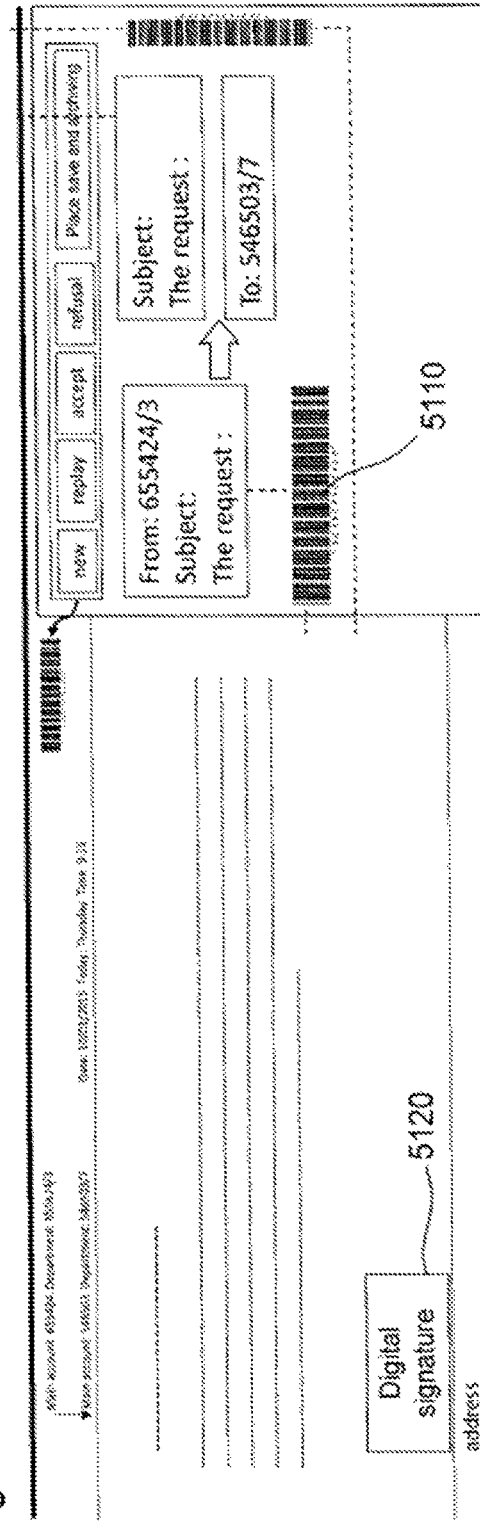

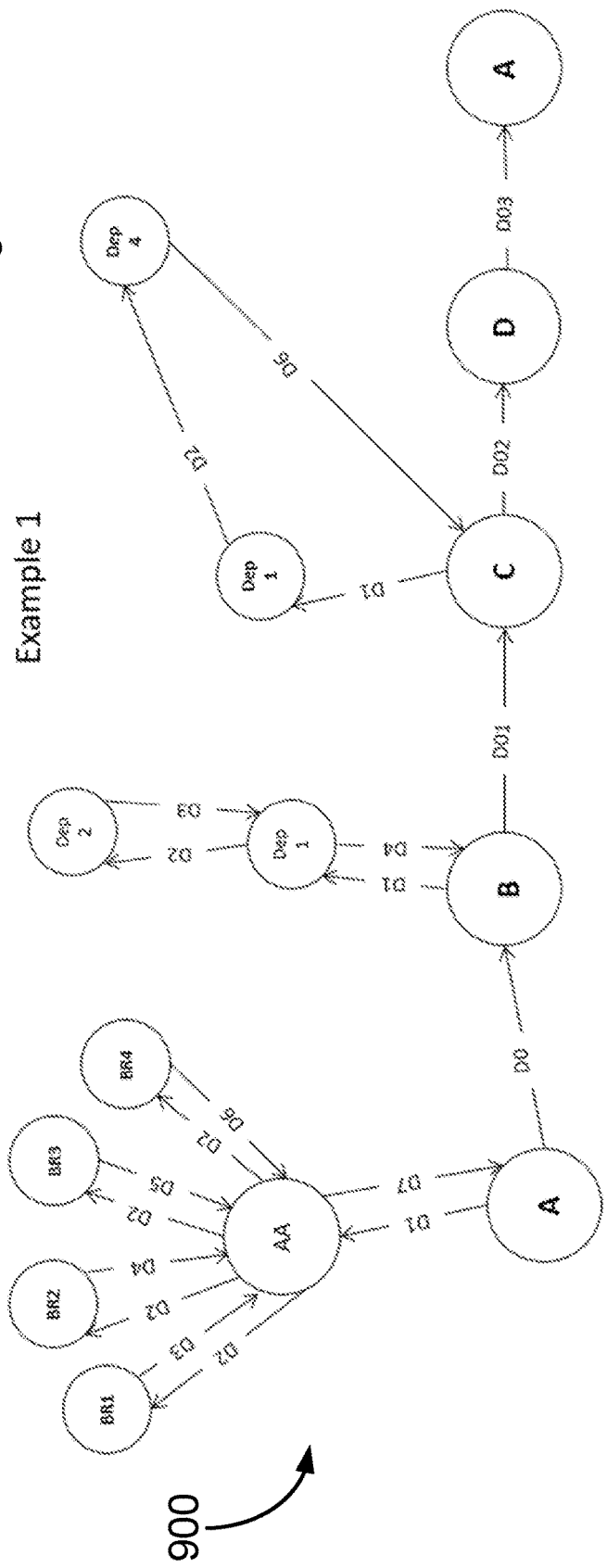

Fig. 9A

Example 1

- A,B,C,D.A is the main path between several companies which is designed to exchange four official documents in order to manufacture amount of an item.
- CO. A who request the amount of such item, CO. B is a first factory, CO. C is a second factory, CO. D is a delivery CO. Usually the amount of item around to 10,000 item, therefore; All documents are predetermined and having a full amount of text and having predetermined portions for the changeable texts.
- All the involved parties whether an employee or the mentioned parties has a separate apparatus.
- Internal path in CO. A is created by sending D1 through departments and brunches in order to get the actual demand of the item, the path of requests and responses documents is shown in Figures 9C-9F.
- Internal path in CO.B is created by sending D1 thorough departments in order to manufacture part of the item which is shown in Figures 9F-9H.
- Internal path in CO.C is created by sending D1 thorough departments in order to manufacture part of the item which is shown in Figures 9H-9I.

Fig. 9B

It is not required to insert the party account because the sender account and the receiver account are already coded in each document; for example, D2 appears in party AA as a sender and also appears in party Branch 4 as a receiver, and the response document D6 appears in party Branch 4 as a sender and appears in party AA as a receiver. Therefore once a sending option to send a document is determined, such document will directly sent to the receiver without inserting the party account.

Example of the document code

| AA account | Document number | Branch4 account |
|---|---|---|
| sender | D2 | receiver |
| receiver | D6 | sender |

Three main actions versus options in each action

Fig. 9D

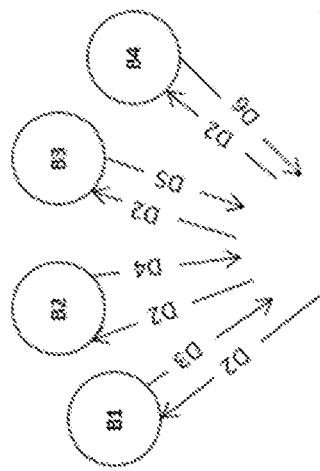

| Formula | Request | Receive | send |
|---|---|---|---|
| Branch 4: receive D2 (options), receive D6 (options), send D6 (options) | Non<br>On time<br>On click<br>Date and time<br>With the receiving | non<br>on time<br>an option with hiding<br>on click<br>date and time<br>with the requesting action | Non<br>an option without link the previous<br>On click<br>Date and time<br>With the receiving action<br>After the receiving action with duration |
| Branch 3: receive D2 (options), receive D5 (options), send D5 (options) | Non<br>On time<br>On click<br>Date and time<br>With the receiving | non<br>on time<br>an option with hiding<br>on click<br>date and time<br>with the requesting action | Non<br>an option without link the previous<br>On click<br>Date and time<br>With the receiving action<br>After the receiving action with duration |
| Branch 2: receive D2 (options), receive D4 (options), send D4 (options) | Non<br>On time<br>On click<br>Date and time<br>With the receiving | non<br>on time<br>an option with hiding<br>on click<br>date and time<br>with the requesting action | Non<br>an option without link the previous<br>On click<br>Date and time<br>With the receiving action<br>After the receiving action with duration |
| Branch 1: receive D2 (options), receive D3 (options), send D3 (options) | Non<br>On time<br>On click<br>Date and time<br>With the receiving | non<br>on time<br>an option with hiding<br>on click<br>date and time<br>with the requesting action | Non<br>an option without link the previous document<br>On click<br>Date and time<br>With the receiving action<br>After the receiving action with duration |

| formula | Request | Receive | send |
|---|---|---|---|
| receive D6 (options), request D7 (options), receive D7 (options), send D7 (options) | Non<br>On time<br>On click<br>Date and time<br>With the receiving<br>before document () or party ()<br>after document () or party ()<br>with document () or party () | Non<br>On time<br>an option with hiding<br>On click<br>Date and time<br>before the relevant documents<br>with the requesting action<br>before document () or party ()<br>after document () or party ()<br>with document () or party () | Non<br>an option without link the previous documents<br>On click<br>Date and time<br>With the receiving action<br>After the receiving action with duration<br>before document () or party ()<br>after document () or party ()<br>with document () or party () |
| receive D5 (options), request D7 (options), receive D7 (options), send D7 (options) | Non<br>On time<br>On click<br>Date and time<br>With the receiving<br>before document () or party ()<br>after document () or party ()<br>with document () or party () | Non<br>On time<br>an option with hiding<br>On click<br>Date and time<br>before the relevant documents<br>with the requesting action<br>before document (6) or party ()<br>after document () or party ()<br>with document () or party () | Non<br>an option without link the previous<br>On click<br>Date and time<br>With the receiving action<br>After the receiving action with duration<br>before document () or party ()<br>after document () or party ()<br>with document () or party () |
| receive D4 (options), request D7 (options), receive D7 (options), send D7 (options) | Non<br>On time<br>On click<br>Date and time<br>With the receiving<br>before document () or party ()<br>after document () or party ()<br>with document () or party () | Non<br>On time<br>an option with hiding<br>On click<br>Date and time<br>before the relevant documents<br>with the requesting action<br>after document (5) or party ()<br>with document () or party () | Non<br>an option without link the previous<br>On click<br>Date and time<br>With the receiving action<br>After the receiving action with duration<br>before document () or party ()<br>after document () or party ()<br>with document () or party () |
| receive D3 (options), request D7 (options), receive D7 (options), send D7 (options) | Non<br>On time<br>On click<br>Date and time<br>With the receiving<br>with document (3)<br>before document () or party ()<br>after document () or party () | Non<br>On time<br>an option with hiding<br>On click<br>Date and time<br>before the relevant documents<br>with the requesting action<br>before document (4) or party ()<br>with document () or party () | Non<br>an option without link the previous documents<br>On click<br>Date and time<br>With the receiving action<br>After the receiving action with duration<br>before document () or party ()<br>after document () or party () |

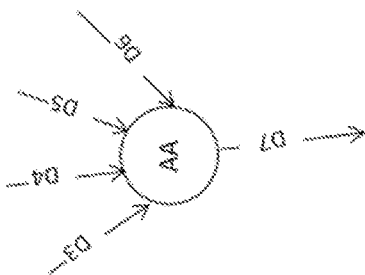

- D3, D4, D5, D6 provide the number of items they need.
- D7 is prepared by AA to populate the total items and the responses from each party can be entered separately or one time such this case, also there are options to determine and arrange documents. In this case D6 is the first one

| Formula | Request | Receive | send |
|---|---|---|---|
| A receive D7 (options), request D0 (options), receive D0 (options), send D0 (options) | Non<br>On time<br>On click<br>Date and time<br>With the receiving | Non<br>On time<br>an option with hiding<br>On click<br>Date and time<br>with the requesting action | Non<br>an option without link the previous<br>On click<br>Date and time<br>With the receiving action<br>After the receiving action with duration |

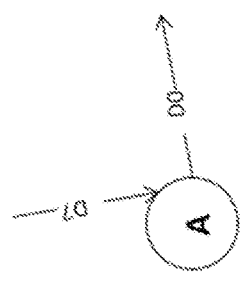

| Formula | Request | Receive | send |
|---|---|---|---|
| B receive D0 (options), request D1 (options), receive D1 (options), send D1 (options) | Non<br>On time<br>On click<br>Date and time<br>With the receiving | Non<br>On time<br>an option with hiding<br>On click<br>Date and time<br>With the receiving<br>with the requesting action | Non<br>an option without link the previous document<br>On click<br>Date and time<br>With the receiving action<br>After the receiving action with duration |

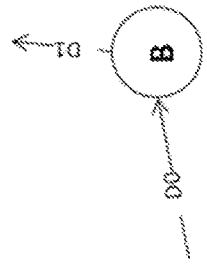

Fig. 9K

| Formula | Request | Receive | send |
|---|---|---|---|
| receive D03 (options), request an document (options), receive the document (options), send the document (options) | Non<br>On time<br>On click<br>Date and time<br>With the receiving | Non<br>On time<br>an option with hiding<br>On click<br>Date and time<br>With the receiving<br>with the requsting action | Non<br>an option without link the previous document<br>On click<br>Date and time<br>With the receiving action<br>After the receiving action with duration |
| A | | | |

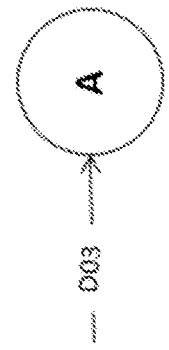

Fig. 10        Example 2

The two apparatus automatically exchange the two documents without any human intervention

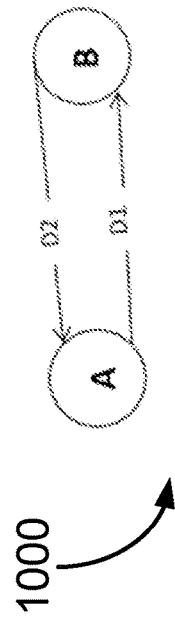

| | Formula | Request | Receive | send |
|---|---|---|---|---|
| A | request D1 (options), receive D1 (options), send D1(options) | Non<br>On time<br>On click<br>Date and time<br>With the receiving | Non<br>On time<br>an option with hiding<br>On click<br>Date and time<br>with the requesting action | Non<br>an option without link the previous<br>On click<br>Date and time<br>With the receiving action<br>After the receiving action with duration |
| B | receive D1(options), request D2 (options), receive D2 (options), send D2 (options) | Non<br>On time<br>On click<br>Date and time<br>With the receiving | Non<br>On time<br>an option with hiding<br>On click<br>Date and time<br>With the receiving<br>with the requesting action | Non<br>an option without link the previous document<br>On click<br>Date and time<br>With the receiving action<br>After the receiving action with duration |

1000

SYSTEM, APPARATUS, METHOD AND COMPUTER PROGRAM PRODUCT TO SET UP A REQUEST FOR, GENERATE, RECEIVE AND SEND OFFICIAL COMMUNICATIONS

CROSS-REFERENCE TO RELATED APPLICATIONS

This application is a Continuation-In-Part of U.S. Utility patent application Ser. No. 14/988,523, titled SYSTEM, APPARATUS, METHOD AND COMPUTER PROGRAM PRODUCT TO SET UP A REQUEST FOR, GENERATE, RECEIVE AND SEND OFFICIAL COMMUNICATIONS, filed Jan. 5, 2016, which claimed the benefit of priority to The Kingdom of Saudi Arabia Patent App. No. 115360181, filed on Jan. 5, 2015, the entire contents and disclosures of which are incorporated herein by reference.

SUMMARY

The present disclosure relates generally to communication systems, apparatuses, methods and computer program products (e.g., computer-readable instructions stored on and/or read from a non-transitory computer readable storage medium that, when executed by a computer, a processor or circuitry, cause the same or another computer, processor or circuitry to perform a method, operations or functions based on the instructions). More precisely, embodiments of the disclosed subject matter relate to communication systems, apparatuses, methods and computer program products to generate, receive, and/or send official, authenticated or secure communications.

For example, a communication apparatus or system according to one or more embodiments of the disclosed subject matter can receive a request from a first party and generate a reply from a second party responsive and corresponding to the request in an automatic, secure and efficient way. The first party can be an individual, by way of a terminal, for instance, requesting information and/or documents, e.g., procedures to follow or certificates, and the second party can be an administrator or repository delivering such requested information and/or documentation.

Thus, a controller (or control circuitry) of the communication apparatus or system can be configured to provide an automatic, secure and efficient way to obtain information and/or documentation from the second party by way of a request submitted by the first party directly into the communication apparatus or a corresponding user interface portion of the system. The request from the first party can be treated handled by the controller to automatically perform predetermined tasks, such as identifying the first party and the second party, analyzing the request from the first party, providing information and/or documentation corresponding to the request, demonstrating authenticity of the information and/or documentation, mailing the information and/or documentation (e.g., via traditional courier, via electronic communications, and/or via an unmanned aerial vehicle courier), archiving the information and/or documentation, and/or retrieving the information and/or documentation.

According to one or more embodiments of the disclosed subject matter, a communication system, apparatus, method or computer program product can comprise or operate an input opening or slot to receive an input request, a display, an input device to receive key inputs for the input request, a scanner to generate a soft copy of the input request, a controller to process the input request and provide an output reply, a printer to print a first hard copy of the output reply and a second hard copy of the output reply, an output opening or slot to dispense the first hard copy of the output reply, and a plurality of bins to store the second hard copy of the output reply.

Embodiments of the disclosed subject matter can also comprise an apparatus (or system or method) to generate and output an official communication document comprising: memory; and circuitry configured to receive an input request from a user requesting the official communication document, the input request including data comprised of one or more of a name, a date, an address, a document number, and an electronically readable pattern, transform the input request into a predetermined electronic format, select, responsive to the received input request, a predetermined official communication document template from among a plurality of predetermined official communication document templates stored in the memory, the predetermined official communication document template having a plurality of predefined portions for population with data, set the selected predetermined official communication document template as an intermediate official communication document having the predefined portions for population with data, determine which data of the input request with which to populate the predefined portions of the intermediate official communication document, populate a first portion of the predefined portions of the intermediate official communication document with the determined data of the input request, based on the received input request, receive data from a database, and populate a second portion of the predefined portions of the intermediate official communication document with data received from the database, determine whether the intermediate official communication document is sufficiently populated with the determined data of the input request and the data received from the database, when the intermediate official communication document is not sufficiently populated, output a request to the user to provide additional data to sufficiently populate the predefined portions of the intermediate official communication document, and receive the requested additional data until the predefined portions of the intermediate official communication document are sufficiently populated, when the predefined portions of the intermediate official communication document are sufficiently populated, electronically add a digital signature and document identification data to the intermediate official communication document to create a finalized official communication document, and output the finalized official communication document to the user as the official communication document.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Further, any values or dimensions in the accompanying figures are for illustration purposes only and may or may not represent actual or preferred values or dimensions. Where applicable, some or all select features may not be illustrated to assist in the description of underlying features. In the drawings:

FIG. 2A is a diagrammatic representation of a non-limiting example of an input request from a first party according to one or more embodiments of the disclosed subject matter;

FIG. 2B is a diagrammatic representation of a non-limiting example of an output request from a second party according to one or more embodiments of the disclosed subject matter;

FIGS. 9A-9K are illustrations of an example of a four-party communication, with different steps of the communication broken out on separate pages, using one or more embodiments of the disclosed subject matter; and FIG. 10 is an illustration of an example of a two-party communication where documents are exchanged without human intervention, according to one or more embodiments of the disclosed subject matter.

DETAILED DESCRIPTION

Figure 1:
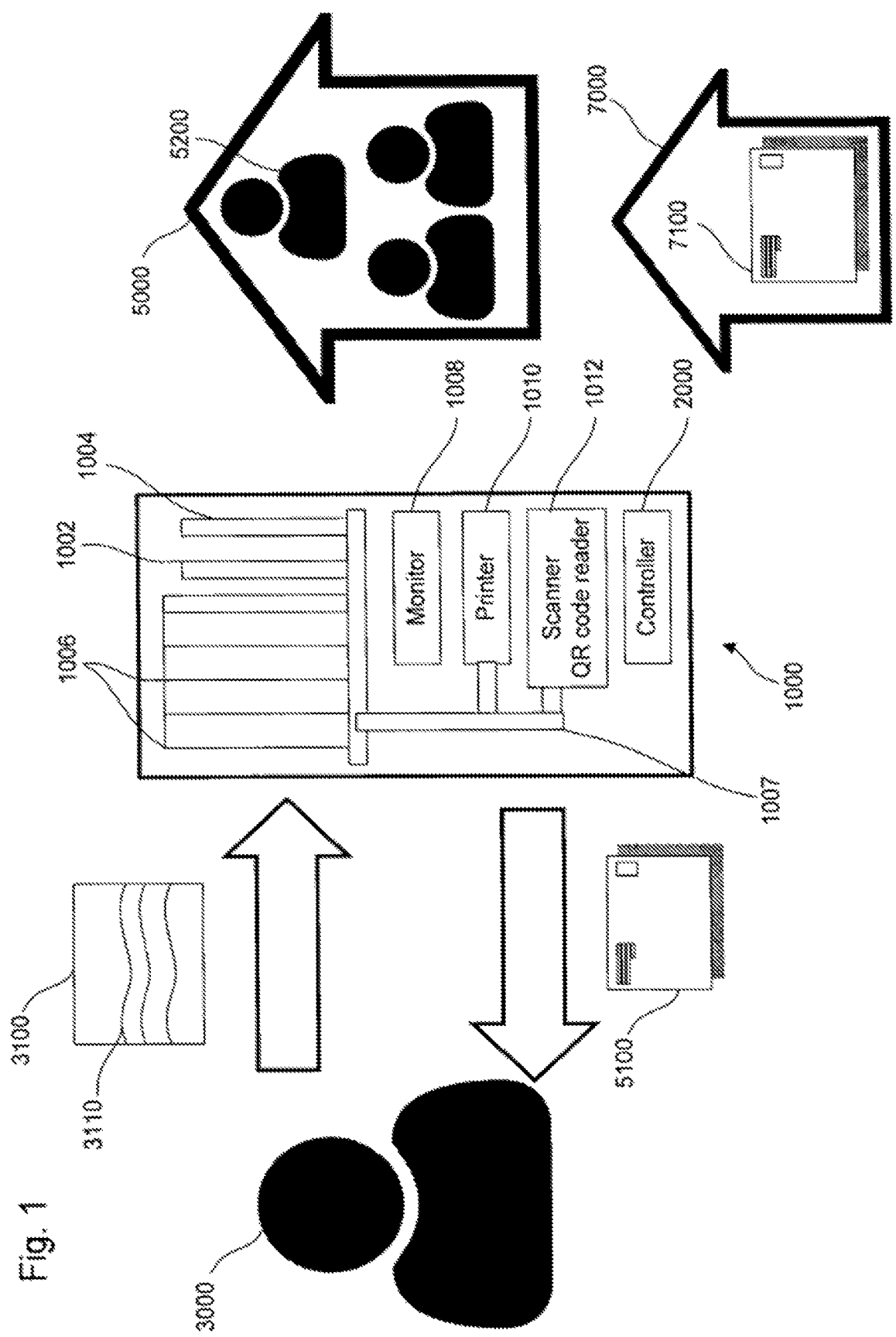
FIG. 1 is a diagrammatic representation of a communication apparatus or system according to one or more embodiments of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Any reference in the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments, and it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

As noted above, embodiments of the disclosed subject matter are directed to generating, receiving, and/or sending official, authenticated or secure communications, particularly where a request from a first party can be received, a reply from a second party can be generated responsive and corresponding to the request in an automatic, secure and efficient way.

In one or more embodiments of the disclosed subject matter, an input request may be received, where the input request may include a requester code comprised of, for example, a requester account, subject and request, or a receiver code comprised of, for example, a receiver account and requester subject and request or code. The requester code can include full or partial text for an official document from the requester. The receiver code can include full or partial text for the official document. When the requester code is included in the input request, a finalized official document can be indirectly sent to the user by first sending an intermediate official document to a computer or apparatus operated by a human, who is different from the user, to add missing or additional data to the intermediate official document prior to finalizing the official document and sending the finalized official document to the user. When the receiver code is included in the input request, the finalized official document can be directly sent to the user without intervention by the human, so long as the finalized official document includes full or a suitable amount of text for the finalized official document, otherwise, the finalized official document is indirectly sent to the user by first sending the intermediate official document to the computer or apparatus operated by the human to add missing or additional data to the intermediate official document prior to finalizing the official document. Optionally, prior to sending to the user, the finalized official document can be modified to include a digital signature.

FIG. 1 is a diagrammatic representation of a communication apparatus or system 1000 according to one or more embodiments of the disclosed subject matter.

Apparatus 1000 can communication with and/or be in communication with a first party 3000 and a second party 5000, for instance, simultaneously or non-simultaneously. Optionally, second party 5000 may be considered part of the communication apparatus 1000 at all times or during certain transactions or operations. Alternatively, first party 3000 may be considered part of the communication apparatus 1000 at all times or during certain transactions or operations.

Discussed in more detail below, first party 3000 can provide an input request 3100 to apparatus 1000, such as illustrated in FIG. 2A, and, in response, communication apparatus 1000 can receive from second party 5000 an output reply 5100 or data thereof so communication apparatus 1000 can generate the output reply 5100, such as illustrated in FIG. 2B.

The communication apparatus 1000 can facilitate communications between the first party 3000, e.g., an individual or an individual by way of a portable electronic device (e.g., tablet, smart phone, cell phone, personal digital assistant, laptop computer), and the second party 5000, e.g., server or computer of an agency, a company and/or a system administer. The communication apparatus 1000 can automatically manage and generate official messages, e.g., official letters and/or documents in standardized format and/or with anti-counterfeit measures (e.g., unique bar code, watermark, embedded circuitry), for instance, from the second party 5000 for receipt by the first party 3000 based on request or inputs by the first party 3000 to the communication apparatus 1000.

The communication apparatus 1000 can comprise an input port 1002 (e.g., an opening, slot, etc.), an output port 1004 (e.g., an opening, slot, etc.), a plurality of bins 1006, a user interface 1008 (e.g., a display and keypad, a touch screen, etc.), a printer 1010, a scanner 1012, and a controller 2000, which can control the aforementioned and other components of the communication apparatus 1000. Not expressly illustrated in FIG. 1, the communication apparatus 1000 may also include memory or a memory device to store data, user inputs, data received from first party 3000, and/or data received from second party 5000.

The user interface 1008 can be an electronic device configured to visually display information and receive user input(s). For example, the user interface 1008 may be a display and keypad or keyboard, of the user interface 1008 may be a touchscreen. Optionally, the user interface 1008 may recognize a user's gesture as in input with or without the user touching the display using gesture sensing and recognition circuitry. Optionally or alternatively, the user interface 1008 can receive and/or output audio data or information, such as a voice command.

In one or more embodiments, the first party 3000 can input the input request 3100 to the communication apparatus 1000 via the input port 1002 and the scanner 1012 of the communication apparatus 1000. The first party 3000 can also input the input request 3100 through the user interface 1008 of the communication apparatus 1000. Optionally, input request 3100, or a portion thereof, can be input by the user to the communication apparatus 1000 via a mobile electronic device of the user.

The input request 3100 can be any kind of written message, in paper form and/or electronic form, requesting or petitioning information and/or documentation from the second party 5000, such as case status, procedure to follow, or a particular formalized, verified, secured, and/or authenticated document, for instance, with a user's unique identification.

The first party 3000 can receive an output reply 5100 corresponding to the input request 3100 from the second party 5000 by way of communication apparatus 1000 and/or directly from the second party 5000 or an agent or affiliate of the second party 5000. The output reply 5100 can be received by the first party 3000 via the output port 1004, printed by the printer 1010, for instance, or additionally or alternatively via the user interface 1008, displayed on a display of the user interface and/or sent to a mobile electronic device for output there, for instance, on a display and/or a speaker. The output reply 5100 can be any kind of written message responsive to or answering the input request 3100. In addition, the output reply 5100 can be a letter or message (in paper format and/or electronic format) considered to be an official message containing identification, as well as official documents, such as birth certificates, tax forms, or vehicle title, for instance, in standardized format and/or with anti-counterfeit measures (e.g., unique bar code, watermark, embedded circuitry).

The communication apparatus 1000 can archive the input request 3100 and the output reply 5100 by storing hard copies of the input request 3100 and the output reply 5100 in the plurality of bins 1006. Bins 1006 may be physical bins and/or electronic bins. Thus, the communication apparatus 1000 can store hard copies of official documents prepared by the communication apparatus 1000 and/or can store electronic copies of the official documents in non-transitory computer-readable memory. Optionally, the official documents and/or corresponding data to create or recreate the official documents may be output from the communication apparatus 1000 for storage by the second party 5000, for instance, or a remote server or memory storage device. Optionally, the ability to archive data and documents can be used by the first party 3000 and/or the second party 5000 to retrieve the input request 3100 and the output reply 5100.

Archiving and retrieval of the output reply 5100 and the input request 3100 can be implemented using a conveyer system 1007, for instance. The conveyer system 1007 can transport the hard copies of the input request 3100 and the input request 3100 from the printer 1010 and to each bin of the plurality of bins 1006, and from each bin of the plurality of bins 1006 to the output port 1004. For example, the conveyer system 1007 can rely on belt conveyors, roller conveyors, chutes, pneumatic tube transport systems, a robotic arm, or a combination thereof. Optionally, the conveyor system 1007 may provide the output reply 5100 directly to the output port 1004, without first being provided in one of the bins 1006.

Thus, generally speaking, and as will be described in more detail relative to FIGS. 3 and 4, the communication system 1000 can receive an input request 3100 from the first party 3000. In one embodiment, the input request 3100 can be a paper or plastic (or some other material, such as rubber, cardboard, electronics, metal or combination of materials) document, card, sheet or three-dimensional object, for instance, having data or information already provided thereon or therein provided to input port 1004 of the communication apparatus 1000. Optionally, the data or information may be considered a request for information, data, or documentation. Optionally or alternatively, the input request 3100 can be in electronic format, for instance, received wirelessly by the communication apparatus from a mobile electronic device operated by the first party 3000. In one or more embodiments, the input request 3100 can be a combination of physical and electronic inputs.

The communication apparatus 1000 can process the input request 3100, for instance using controller 2000, or a processor or processing circuitry, and provide feedback to the first party 3000, for instance, requesting additional information (e.g., a further input request, which may be considered part of the initial input request 3100), and/or receiving data or information from the second party 5000 based on the input request 3100 or information or data thereof.

Based on the data or information received from the second party 5000 and optionally the additional information received from the first party 3000, the communication apparatus 1000 can output to the first party 3000 the output reply 5100, which can be in "hard" format (e.g., paper, plastic, etc. or even data or information added externally or internally to the input request 3100 when in physical format). As noted above, the output reply may be output via one of the output port 1004. Optionally or alternatively, the output reply 5100 can be in electronic format, for instance, output (e.g., visual and/or audio) on the user interface 1008 of the communication apparatus 1000 and/or transmitted electronically to a mobile electronic device of the first party 3000. As noted above, the output reply 5100 can be a letter or message considered to be an official message containing identification of the first party 3000 and/or the second party 5000, as well as official documents, such as birth certificates, tax forms, or vehicle title, for instance, in standardized format and/or with anti-counterfeit measures (e.g., unique bar code, watermark, embedded circuitry).

Figure 3:
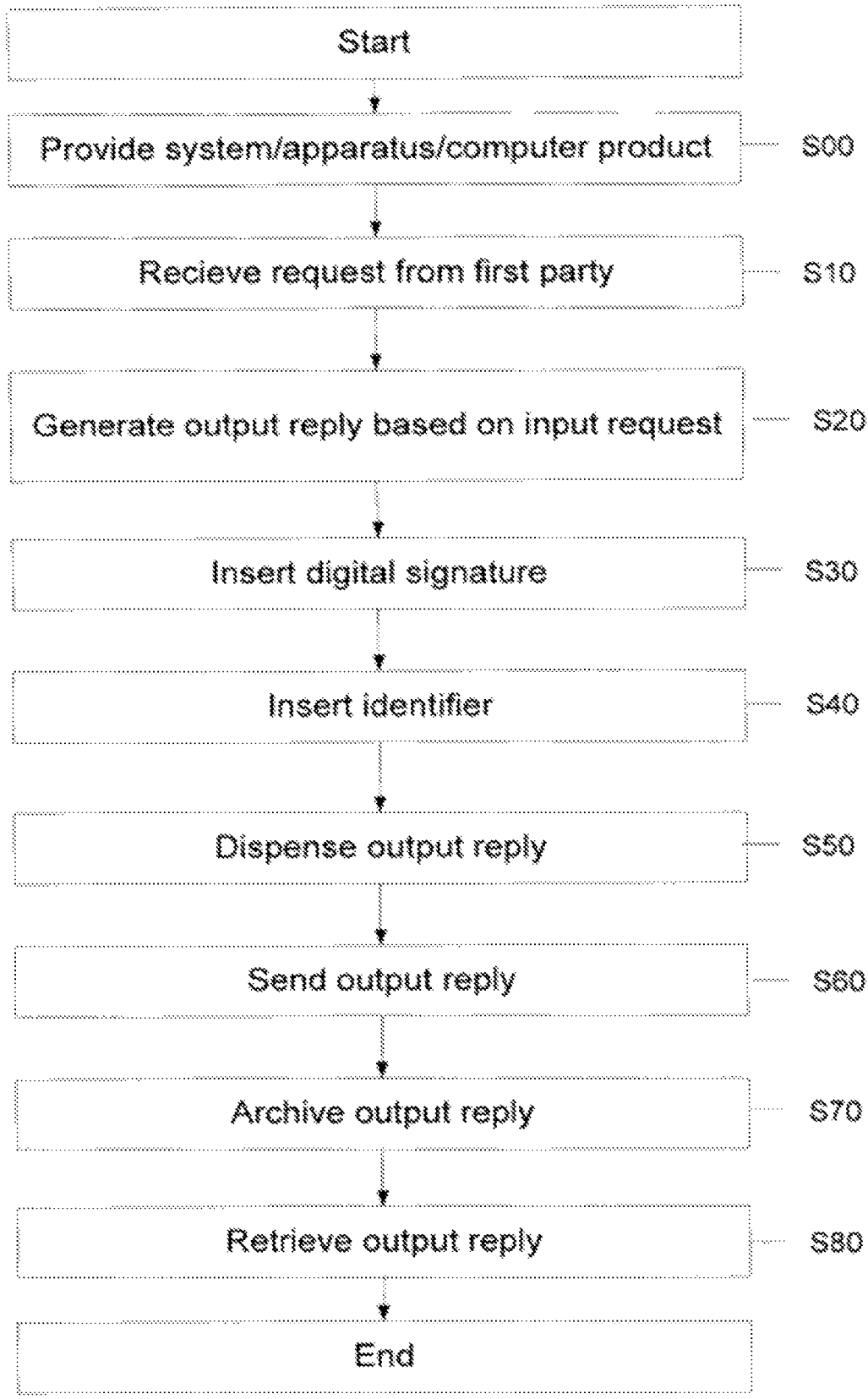
FIG. 3 is a basic flow chart of a communication method or operations according to one or more embodiments of the disclosed subject matter.

Turning now to FIG. 3, this figure is a flow chart of a method of communicating data or information to a first party according to one or more embodiments of the disclosed subject matter, implemented, for instance, using the communication apparatus 1000 of FIG. 1.

Optionally, in a step S00, a communication apparatus, such as communication apparatus 1000, can be provided.

In a step S10, an input request 3100 can be received at a communication apparatus, for instance, from a first party. As noted above, the input request 3100 can be provided directly by entering the input request 3100 on the user interface 1008 of the communication apparatus 1000. For example, a graphical user interface can be displayed on the user interface 1008 via software instructions performed by the controller 2000. This graphical user interface can have key inputs 3110 to be filled in by the first party 3000. Examples of data for the key inputs 3110 include name(s), address(es), date(s), document name(s), document number(s), identification number(s) (e.g., bank accounts, social security numbers), key word(s), and/or key sentence(s).

Alternatively, the input of the input request 3100 can be performed by inserting a physical medium containing data or a message, such as a piece of paper with a written text, into the input port 1002. The physical message can be converted into electronic format, for instance, using the scanner 1012 and processing circuitry, for instance, controller 2000. For example, the software instructions can rely on optical character recognition tools to convert an image of the input request 3100 provided by the scanner 1012 into machine-encoded text.

As yet another option or alternative, the input request 3100 can be received wirelessly by the communication apparatus 1000, using wireless interface circuitry, from a mobile electronic device of the first party.

In a step S20, an output reply 5100 can be generated based on the input request 3100. Step S20 is further described below relative to FIG. 4.

In a step S30, anti-counterfeit operations can be performed to the output reply 5100 prior to being output. For example, a unique bar code, watermark, embedded circuitry, and/or a digital signature can be added to the output reply 5100, depending upon the physical or electronic format of the output reply 5100, for instance, to show that authentication and integrity of the reply message, e.g., the output reply 5100 was not altered or modified.

For example, insertion of the digital signature 5120 can be performed relying key generation instructions, signing instructions, and signature verifying instructions. The key generation instructions can randomly provide a private key and a corresponding public key, the signing instructions can produce a signature from the private key an a message, and the signature verifying instructions can from the public key and the signature either accept or reject the message.

In a step S40, an identifier 5110 containing key information can be inserted to the output reply 5100, for instance, under the form of an optical machine-readable representation of data, such as a one-dimensional barcode or a two-dimensional barcode such as a QR code. The key information may include keywords, reference numbers, document names, dates, names and addresses of the first party 3000 and/or second party 5000 describing both the content of the input request 3100 and the output reply 5100.

In a step S50, a hard copy of the output reply 5100 can be generated via the printer 1010, and can be dispensed to the first party 3000 via the output port 1004.

Alternatively, an initial soft copy of the output reply 5100, for instance, with the identifier 5110, can be displayed to the first party 3000 on the user interface 1008 of the communication apparatus 1000 and/or can be sent by electronic telecommunication, e.g., text, email, etc., to the first party 3000 and/or the second party 5000 through a network interface 2026 of the controller 2000.

In S60, land mail 7100 containing a second hard copy of the output reply 5100 can be generated by the communication apparatus 1000, for instance, using controller 2000, and sent by sending a mailing request to a mail courier service 7000, or be accessible to the first party 3000 through a node or virtual private network (VPN) 6000 connected to the controller 2000.

In a step S70, the output reply 5100 can be archived by the communication apparatus 1000. A first soft copy of the output reply 5100 can be stored in a memory 2004 of the controller 2000 (or processor or processing circuitry). In addition, a third hard copy of the output reply 5100 can be generated via the printer 1010 and placed into one bin of the plurality of bins 1006 of the communication apparatus 1000.

In a step S80, the first party 3000 and/or the second party 5000 can retrieve a supplementary copy of the output reply 3100, wherein the supplementary copy of the output reply 3100 may be the hard copy archived in S60. The third hard copy may be retrieved only by the first party 3000, only by the second party 5000, and/or only by a third party (e.g., a trusted courier), for instance, using a unique physical or electronic key to open the bin 1006.

The first party 3000 and/or the second party 5000 can provide the identifier 5110 of the output reply 5100 to the communication apparatus 1000. For example, the first party 3000 and/or the second party 5000 can provide a reading of the identifier 5110, e.g., barcode, printed on a piece of paper or any other display support via the scanner 1012 of the communication apparatus 1000. For example, the barcode can be printed from an electronic message according to step S40.

In addition, the controller 2000 can verify the identities of the first party 3000 and/or the second party 5000 to ensure that the first party 3000 and/or the second party 5000 are authorized to retrieve a supplementary copy of the output reply 3100. The identity verification may be performed via physical identification documents such as a driver's license, passport, or credit card that may be electronically uploaded to the memory 2004 of the controller 2000 via the scanner 1012 of the communication apparatus 1000. For example, the controller 2000 via software instructions relying on character recognition tools can recognize key identification elements such as names, physical and/or electronic addresses, date of birth and/or identification numbers and compare them to the some of the key information contained the message identifier 5110.

Once the identifier 5110 and identities have been verified, the printer 1010 of the communication apparatus 1000 can print a supplementary hard copy of the input request 3100 and/or the output reply 5100.

Figure 4:
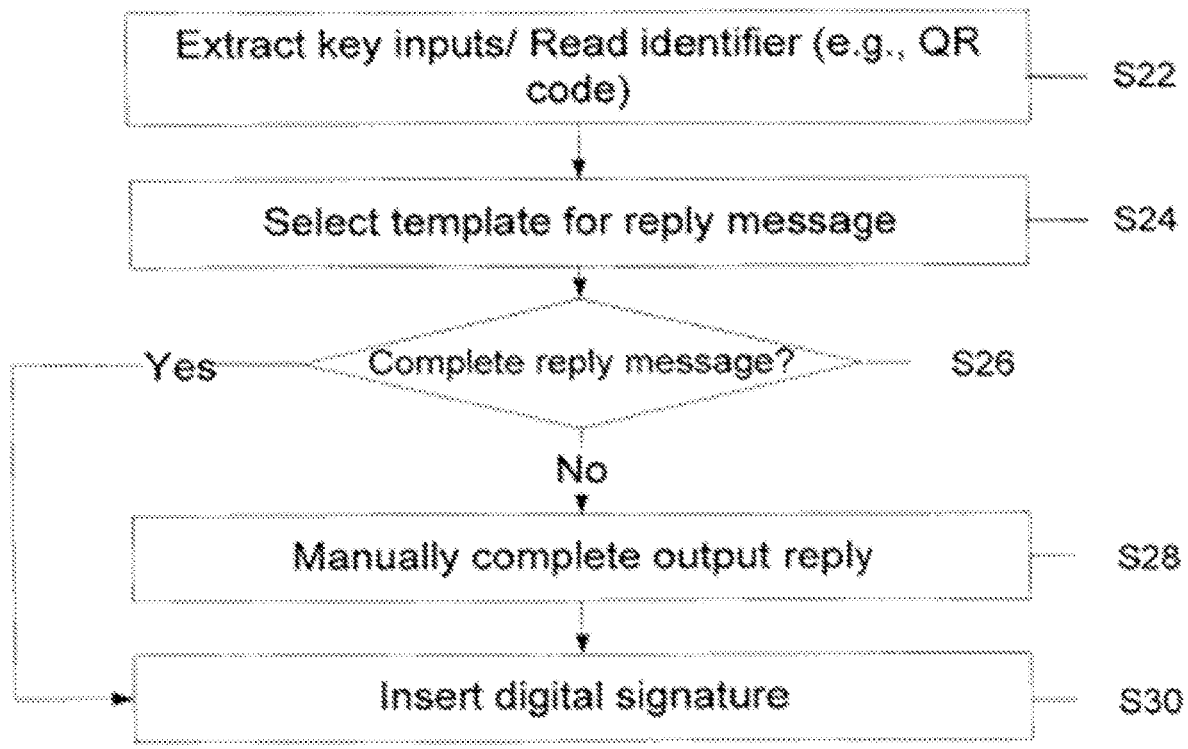
FIG. 4 is a basic flow chart of a method or operations to generate an output reply according to one or more embodiments of the disclosed subject matter.

FIG. 4 is a basic flow chart of a method to generate the output reply 5100 of the second party 5000 based on the input request 3100 of the first party 3000 according to one or more embodiments of the disclosed subject matter.

In a step S22, the controller 2000 via software instructions can extract the key inputs 3110 from the input request 3100. The key inputs 3110 can be any kind of semantic information for assessing the request from the first party 3000. For example, the key inputs 3110 can be names, physical and/or electronic addresses, dates, document names, document numbers, identification number (e.g., bank accounts, social security numbers), key words, and/or key sentences.

When a graphical user interface is used by the first party 3000 to enter the input request 3100, the key inputs 3110 can be directly extracted from the step S10.

When the input request 3100 is entered by providing a physical object to the input port 1002, the extraction of the key inputs 3110 can be performed by scanning, optical recognition, text mining, etc. Text mining can include text categorization, text clustering, concept/entity and fact extraction, and production of granular taxonomies, sentiment analysis, document summarization, and entity relation modeling. For example, the key inputs 3110 can be identified by text pattern matching and by searching specific strings of characters that can be stored in the memory 2004 of the controller 2000.

In a step S24, based on the key inputs 3110, a template for the output reply 5100 can be selected by the controller 2000 from a reply database containing a plurality of templates. The reply database can be stored in the memory 2004 of the controller 2000.

The selection by the controller 2000 can be performed by a matching parameter P assigned to each template of the plurality of templates and choosing the template with the highest matching parameter P. Depending on the key inputs 3110, the matching parameter P may take value between 0 and 1, where 1 can indicate a perfect match and 0 can indicate a complete mismatch.

For example, each template can contain fields to be filled with the key inputs 3110 previously extracted in the step S22. Then, the matching parameter P can be computed for each template by measuring how many fields can be filled from the key inputs 3110. Accordingly, a matching parameter P equal to 1 can indicate that all the fields of the template can be filled with the key inputs 3110 extracted in the step S22, while a matching parameter P equal to 0 can indicate that none of the fields of the template can be filled with the key inputs 3110.

In a step S26, the controller 2000 can verify that the output reply 5100 is considered as completed. For example, the completeness verification can be performed by comparing the matching parameter P with a predetermined completeness threshold. If the value of the matching parameter P of selected template used to generate the output reply 5100 is less than or equal to the completeness threshold, the output reply 5100 may be considered as uncompleted, and the process goes to a step S28. If the value of the matching parameter P for the selected template is greater than the completeness threshold the reply message can be considered as completed, and the process goes to the step S30 of the method illustrated in FIG. 3.

In a step S28, the uncompleted reply message can be sent to a person in charge 5200 of the second party 5000 to be manually completed via electronic communication, e.g., instant message system. For example, the person in charge 5200 can be an employee of the third party specially assigned to this task. Once the step S28 has been executed the process goes to the step S30 of the method illustrated in FIG. 3.

Figure 5:
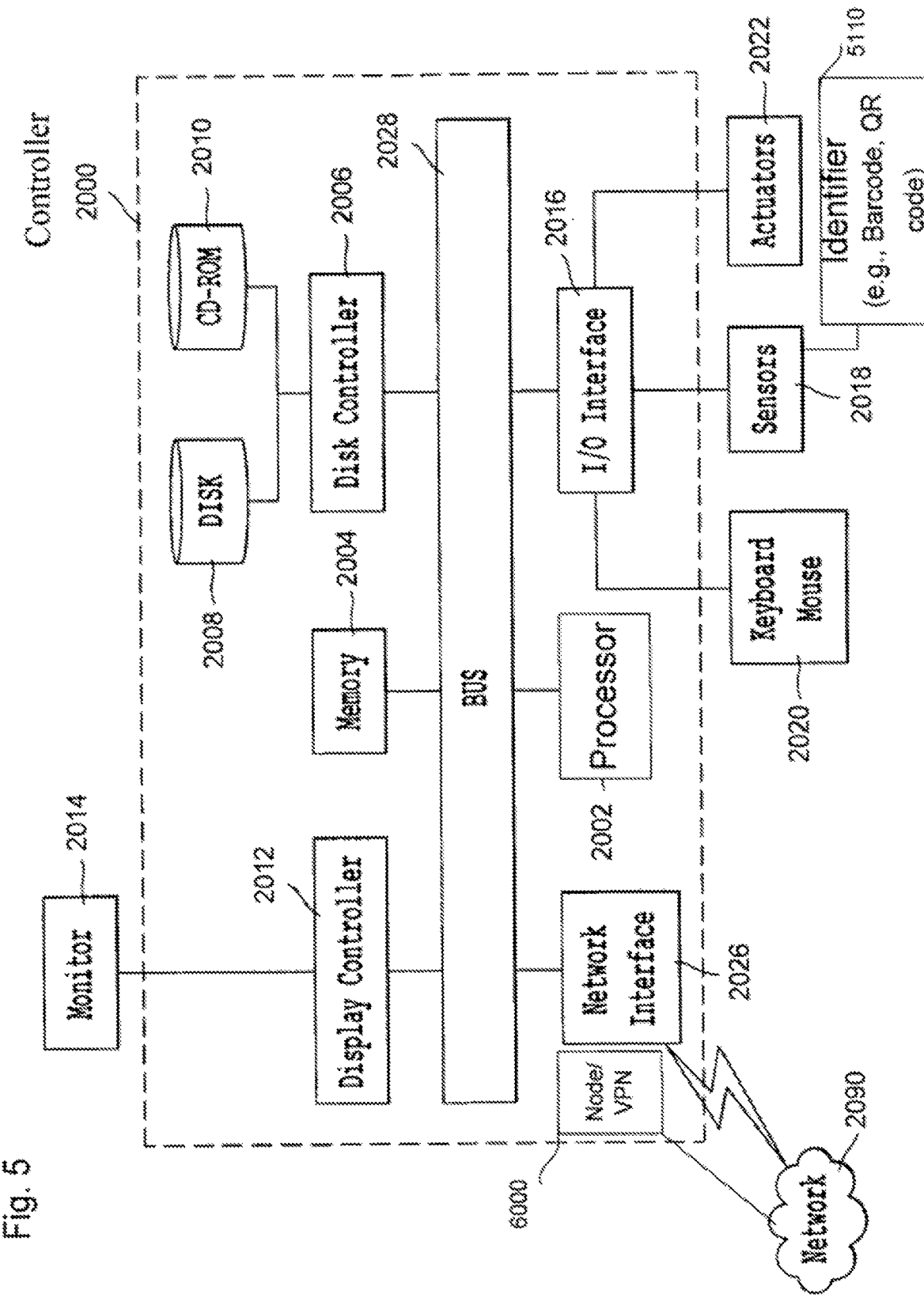
FIG. 5 is a block diagram representation of a portion of a communication apparatus or system according to one or more embodiments of the disclosed subject matter.

FIG. 5 depicts a controller 2000 (or processor or processing circuitry) that may control the communication apparatus 1000 according to one or more embodiments of the disclosed subject matter.

As shown in FIG. 5, systems, operations, and processes in accordance with this disclosure may be implemented using a processor 2002 or at least one application specific processor (ASP). The processor 2002 may utilize a computer readable storage medium, such as the memory 2004 (e.g., ROM, EPROM, EEPROM, flash memory, static memory, DRAM, SDRAM, and their equivalents), configured to control the processor 2002 to perform and/or control the systems, operations, and processes of this disclosure. Other storage mediums may be controlled via a disk circuitry 2006, which may control a hard disk drive 2008 or optical disk drive 2010.

The processor 2002 or aspects thereof, in an alternate embodiment, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The processor 2002 may be a separate device or a single processing mechanism. Further, this disclosure may benefit form parallel processing capabilities of a multi-cored processor.

In another aspect, results of processing in accordance with this disclosure may be displayed via a display controller 2012 to the display and input device 1008 that may be peripheral to or part of the circuitry 2000. Moreover, the display and input device may be provided with a touch-sensitive interface to a command/instruction interface. The display controller 2012 may also include at least one graphic processing unit for improved computational efficiency. Additionally, the circuitry 2000 may include an I/O (input/output) interface 2016, provided for inputting sensor data from sensors 2018, such as the camera 2001, and for outputting orders to actuators 2022. The sensors 2018 and actuators 2022 are illustrative of any of the sensors and actuators described in this disclosure.

Further, other input devices may be connected to an I/O interface 2016 as peripherals or as part of the controller 2000. For example, the keyboard 2020 may control parameters of the various processes and algorithms of this disclosure, and may be connected to the I/O interface 2016 to provide additional functionality and configuration options, or to control display characteristics. Actuators 2022 which may be embodied in any of the elements of the apparatuses described in this disclosure may also be connected to the I/O interface 2016.

The above-noted hardware components may be coupled to the network 2024, such as the Internet or a local intranet, via the network interface 2026 for the transmission or reception of data, including controllable parameters to a mobile device. A central BUS 2028 may be provided to connect the above-noted hardware components together, and to provide at least one path for digital communication there between.

The network 2090 can be linked to the node or VPN 6000 to directly connect the communication apparatus 1000, the first party 3000 and/or the second party 5000. The node or VPN 6000 can be used to directly send and receive the input request 3100 and the output reply 5100.

In some example embodiments, the communication apparatus, system, or portions thereof may be embodied as, or included as, a component of a communications device with wired or wireless communications capabilities. In this regard, the apparatus, system, or portion thereof may be configured to operate in accordance with the functionality of one or more network elements. As noted above, a processor or processing circuitry implemented in embodiments of the disclosed subject matter may be embodied as various means for implementing the various functionalities of example embodiments of the present invention including, for example, a microprocessor, a coprocessor, a controller, a special-purpose integrated circuit such as, for example, an application specific integrated circuit (ASIC), a field programmable gate array (FPGA), a hardware accelerator, processing circuitry and/or the like. According to an example embodiment, the processor or processing circuitry may be representative of a plurality of processors, or one or more multiple core processors, operating in concert. Further, the processor or processing circuitry may be comprised of a plurality of transistors, logic gates, a clock, e.g., oscillator, other circuitry, and/or the like to facilitate performance of the functionality described herein. The processor or processing circuitry may, but need not, include one or more accompanying digital signal processors. In some example embodiments, the processor or processing circuitry is configured (or configurable) to execute instructions stored in a memory device or instructions otherwise accessible to the processor or processing circuitry. The processor or processing circuitry may be configured to operate such that the processor causes an apparatus, a system, or portion(s) thereof to perform various functionalities, operations, or steps as described herein, such as with respect to FIGS. 3 and 4.

Whether configured as hardware or via instructions stored on a computer-readable storage medium (e.g., a non-transitory computer-readable storage medium), or by a combination thereof, the processor or processing circuitry may be an entity configured to perform, and/or cause the apparatus, system or portion(s) thereof to perform operations according to embodiments of the disclosed subject matter while configured accordingly. Thus, in example embodiments where the processor or processing circuitry is embodied as, or is part of, an ASIC, FPGA, or the like, the processor or processing circuitry can be specifically configured hardware for conducting, or causing the performance of, the operations, functionalities or steps described herein, such as with respect to FIGS. 3 and 4.

Alternatively, in example embodiments where the processor or processing circuitry is embodied as an executor of instructions stored on a computer-readable storage medium (e.g., a non-transitory computer-readable storage medium), the instructions can specifically configure the processor or processing circuitry to perform, and/or cause the performance of, the algorithms and operations described herein. In some example embodiments, the processor or processing circuitry is a processor/processing circuitry of a specific device configured for employing example embodiments of the disclosed subject matter by further configuration of the processor or processing circuitry via executed instructions for performing, and/or causing the performance of, the algorithms, methods, and operations described herein, such as with respect to FIGS. 3 and 4.

Memory or memory devices implemented as part of the communication apparatus or system according to embodiments of the disclosed subject matter may be one or more computer-readable storage media (e.g., a non-transitory computer-readable storage media) that may include volatile and/or non-volatile memory. In some example embodiments, the memory can include Random Access Memory (RAM) including dynamic and/or static RAM, on-chip or off-chip cache memory, and/or the like. Further, the memory may include non-volatile memory, which may be embedded and/or removable, and may include, for example, read-only memory, flash memory, magnetic storage devices, e.g., hard disks, floppy disk drives, magnetic tape, etc., optical disc drives and/or media, non-volatile random access memory (NVRAM), and/or the like. Further, the memory may include a cache area for temporary storage of data. In this regard, at least a portion or the entire memory may be included within the processor or processing circuitry as described herein or equivalents thereof.

Further, the memory may be configured to store information, data, applications, computer-readable program code instructions, and/or the like for enabling the processor or processing circuitry and the example apparatus or system to carry out various functions in accordance with example embodiments of the described subject matter. For example, the memory may be configured to buffer input data for processing by the processor or processing circuitry. Additionally, or alternatively, the memory may be configured to store instructions for execution by the processor or processing circuitry.

I/O interface(s) according to one or more embodiments of the disclosed subject matter may be any device or circuit embodied in hardware, software or a combination of hardware and software configured to interface the processor or processing circuitry with other circuitry, devices, user(s), or systems, such as a communications interface and/or a user interface. In some example embodiments, the processor or processing circuitry may interface with the memory via one or more I/O interfaces. The I/O interface(s) may be configured to convert signals and data into a form that may be interpreted by the processor or processing circuitry. The I/O interface(s) may also perform buffering of inputs and outputs to support the operation of the processor or processing circuitry. According to some example embodiments, the processor or processing circuitry and the I/O interface(s) may be combined onto a single chip or integrated circuit configured to perform, or cause the communication apparatus to perform, various functionalities, operations or steps, such as those described relative to FIGS. 3 and 4.

One or more communication interfaces may be implemented as part of communications apparatuses or systems according to embodiments of the disclosed subject matter may be a device component embodied in hardware, software or a combination of hardware and software configured to receive and/or transmit data from/to one or more networks (e.g., radio access networks, local networks, the Internet, an analog network, etc.), a user or users, and/or any other device or module in communication with the communication apparatus or system according to embodiments of the disclosed subject matter. The processor or processing circuitry may also be configured to facilitate communications via the communications interface(s) by, for example, controlling hardware included within the communications interface(s). In this regard, the communication interface(s) may include, for example, one or more antennas, a transmitter, a modem, a receiver, a transceiver and/or supporting hardware, including, for example, a processor or processing circuitry to enable communications via the communication interface(s). Optionally, communication apparatuses or systems according to embodiments of the disclosed subject matter may communicate with various other network elements in a device-to-device fashion and/or via indirect communications.

Communications interface(s) according to embodiments of the disclosed subject matter may be configured to provide for communications in accordance with any of a number of wired or wireless communication standards.

At least one communication interface according to embodiments of the disclosed subject matter may be a user interface, which may be in communication with the processor or processing circuitry to receive user input and/or to present output to a user as, for example, audible, visual, mechanical or other output indications. The user interface may include, for example, a keyboard, a mouse, a joystick, a display, e.g., a touch screen display, a microphone, a speaker, or other input/output mechanisms. Further, the processor or processing circuitry may comprise, or be in communication with, user interface circuitry configured to control at least some functions of one or more elements of the user interface.

The processor/processing circuitry and/or user interface circuitry may be configured to control one or more functions of one or more elements of the user interface through computer program instructions (e.g., software and/or firmware) stored on a memory accessible to the processor or processing circuitry (e.g., memory device). In some example embodiments, the user interface circuitry is configured to facilitate user control of at least some functions of the communications apparatus or system through the use of a display and configured to respond to user inputs. The processor or processing circuitry may also comprise, or be in communication with, display circuitry configured to display at least a portion of a user interface, where the display and the display circuitry can be configured to facilitate user control of at least some functions of apparatus.

Figure 6:
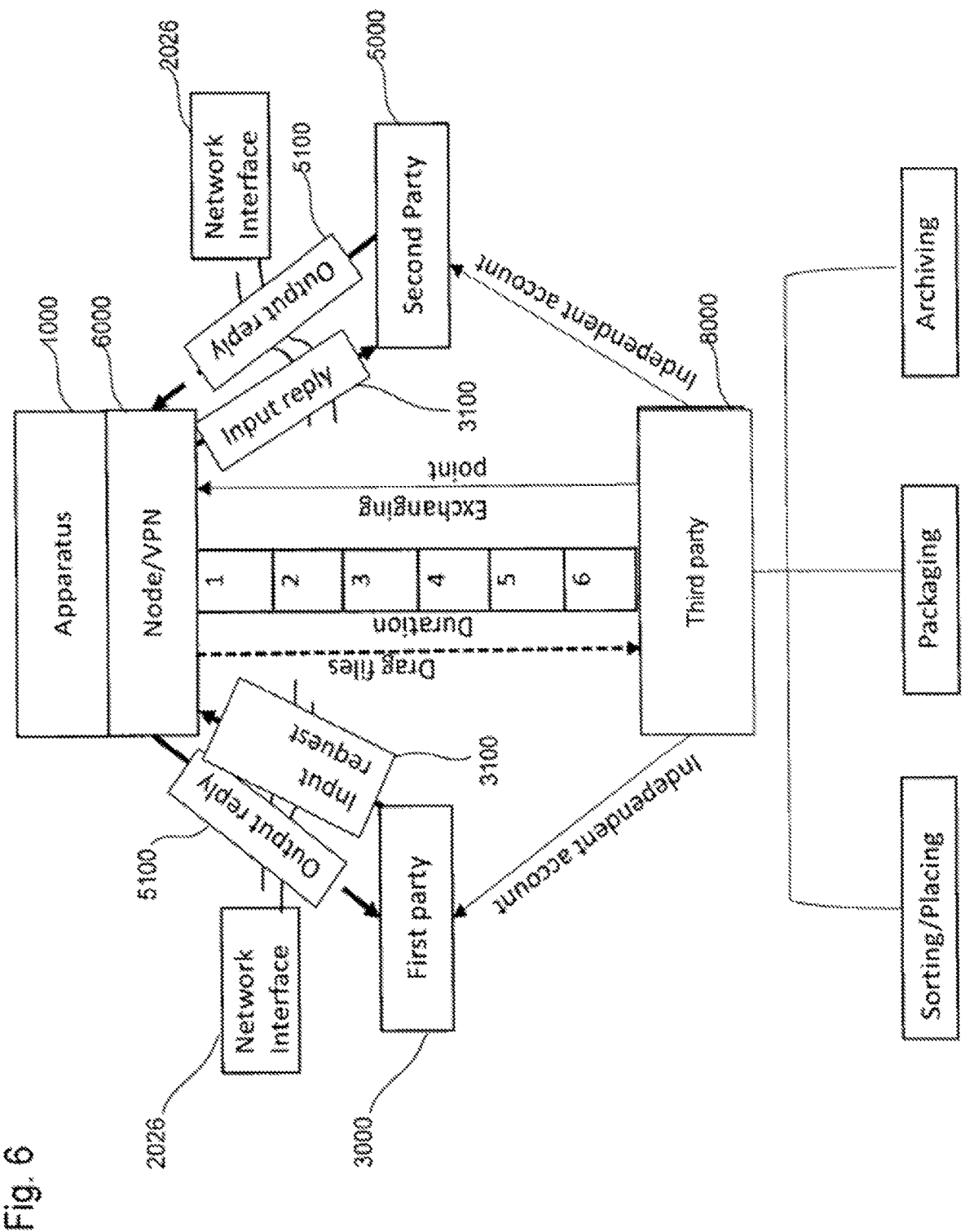
FIG. 6 is a functional block diagram of examples of interactions between a communication apparatus, a first party and a second party via a node or virtual private network according to one or more embodiments of the disclosed subject matter.

FIG. 6 is a functional block diagram of examples of interactions between the communication apparatus 1000, the first party 3000 and the second party 5000 through the node or VPN 6000 according to one or more embodiments of the disclosed subject matter.

The node or VPN 6000 can be configured to establish a virtual point-to-point connection or access between the communication apparatus 1000, the first party 3000, and the second party 5000. The node or VPN 6000 can be used by the first party 3000 to submit the input request 3100 to the second party 5000 via the apparatus 1000 and receive the output reply 5100 from the second party 5000 via the apparatus 1000. Similarly, the node or VPN 6000 can be used by the second party 5000 to send the output reply 5100 to the first party 3000 via the apparatus 1000 and receive the input request 3100 from the first party 3000 via the apparatus 1000.

Optionally, the node or VPN 6000 can be used by a third party 8000 to supervise, authorize, certify and/or confirm the communications between the first party 3000 and the second party 5000. The third party 8000 can be an independent party having no interest with the first party 3000 and the second party 5000, such as a certification company or organization. The third party 8000 can supervise, authorize, certify and/or confirm the communications between the first party 3000 and the second party 5000 by accessing and controlling the content of the input request 3100 and the output reply 5100.

Figure 7:
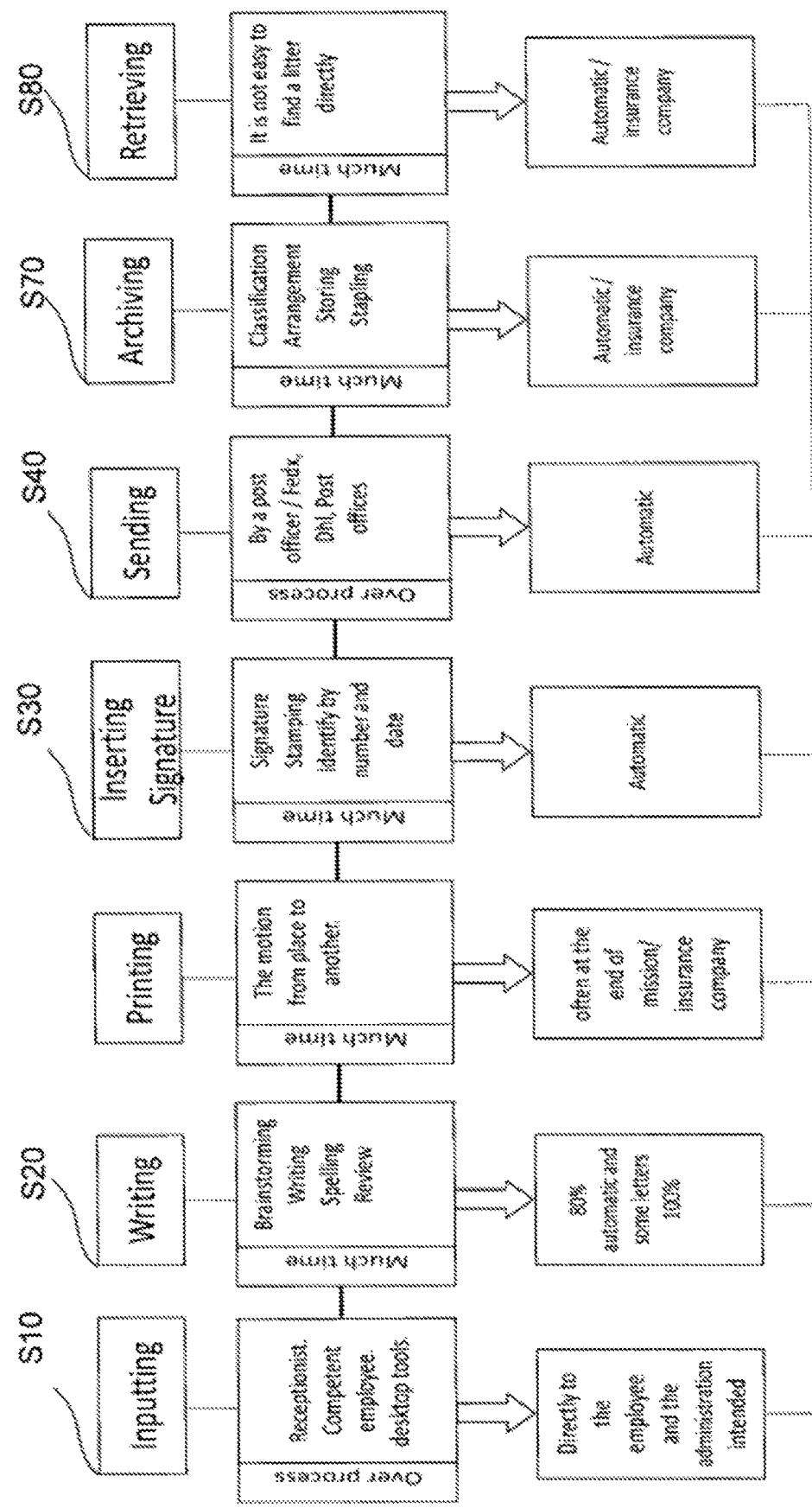
FIG. 7 is a block diagram representation of a portion of operations implemented according to one or more embodiments of the disclosed subject matter.

FIG. 7 is a block diagram representation of the main steps implemented by the communication apparatus 1000, according to one or more embodiments of the disclosed subject matter.

The system, apparatus, method and computer product disclosed in this application can be configured to automatically manage, generate and exchange official messages between the first party 3000 and the second party 5000. To automatically manage, generate and send official messages between the first party 3000 and the second party 5000, the step S10 of receiving the input request 3100, the step S20 of writing the output reply 5100, the step of printing the output reply 5100, the step S30 of generating anti-counterfeit operations, the step S40 of inserting the identifier 5110, the step of archiving S70, the step S80 of retrieving supplementary copies of the output reply 3100 are all performed automatically by the apparatus 1000, see FIG. 3 and corresponding descriptions for more details.

The automatic implementation of the steps S10, S20, S30, S40, S70 and/or S80 can reduce manual interventions and make the communication between the first party 3000 and the second party 5000 faster and more economical than conventional systems and/or method that completely rely on manual interventions to communicate.

The embodiments of the disclosed subject matter are directed to apparatus, method, and computer product to automatically manage, generate and send official messages, between two or more parties. The apparatus, method, and computer product can also be configured to determine the primary purpose and emergency of the official messages between the different involved parties, e.g., the first party 3000 and the second party 5000, by extracting key information and/or keywords contained in the official messages. The apparatus, method, and computer product can also be configured to generate the official messages in a fully automatic way, i.e., without any manual intervention, or in a partially automatic way, i.e., with manual intervention.

Figure 8:
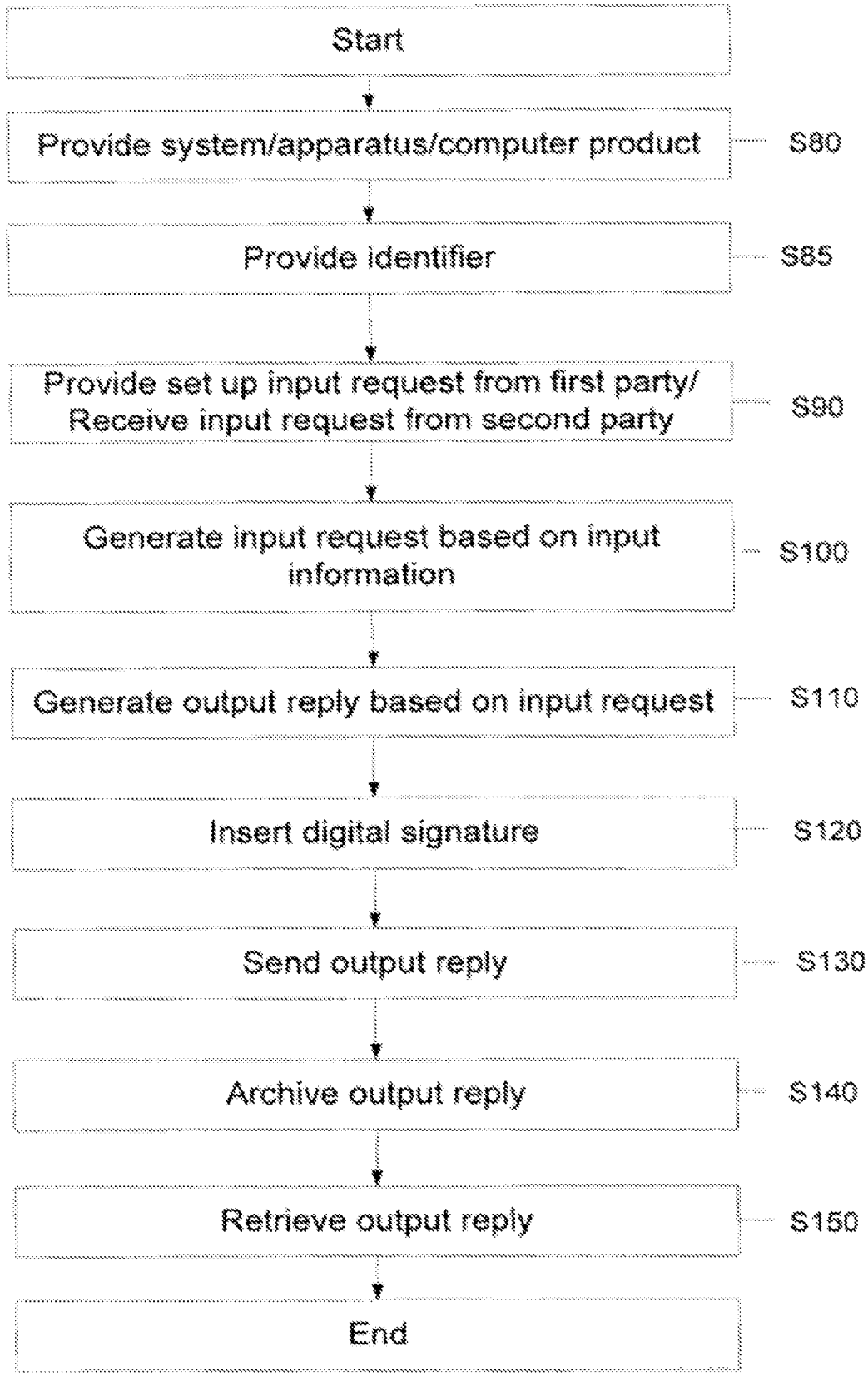
FIG. 8 is a basic flow chart of a method of operations according to one or more embodiments of the disclosed subject matter.
Figure 9C:
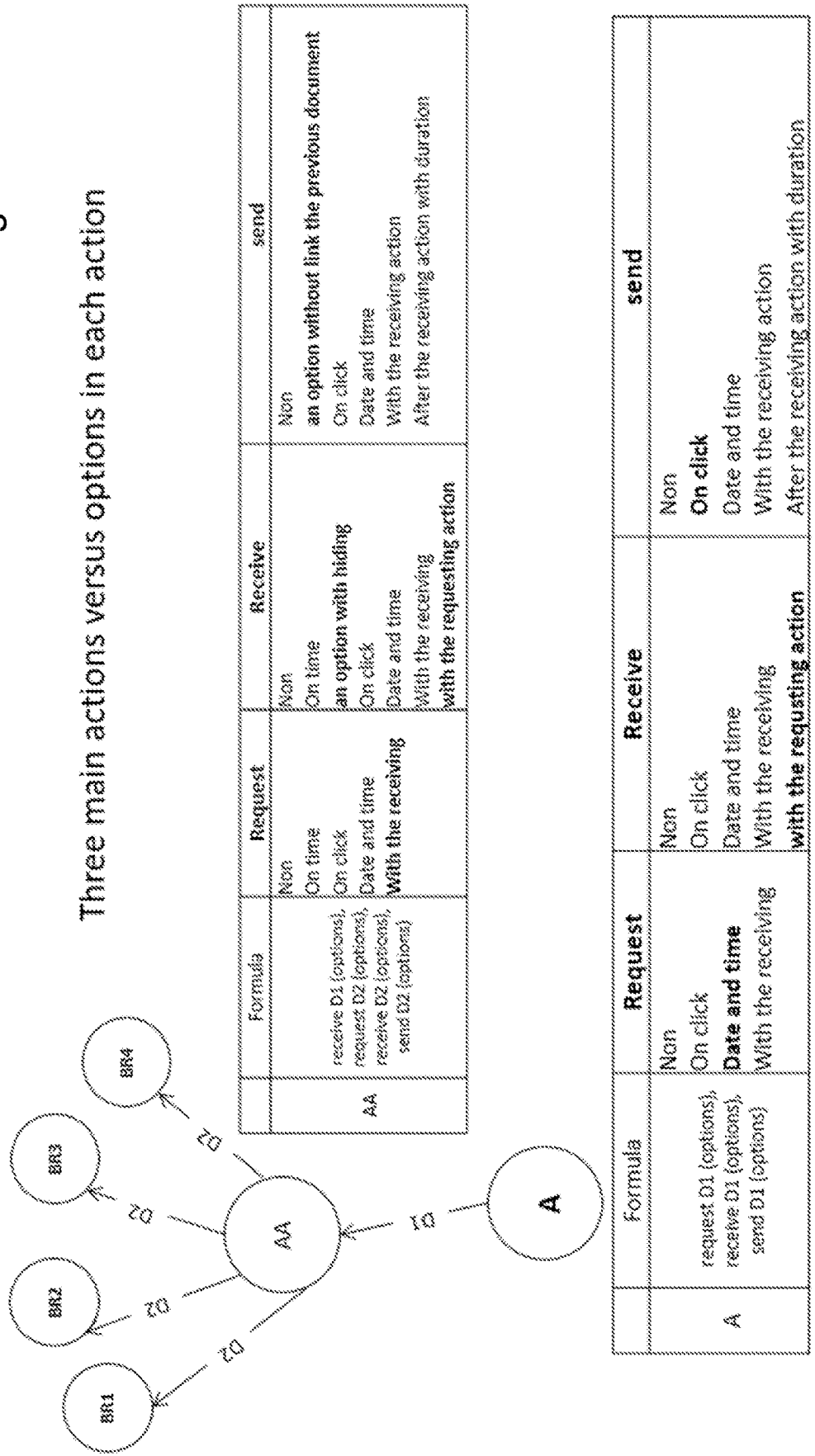
Figure 9G:
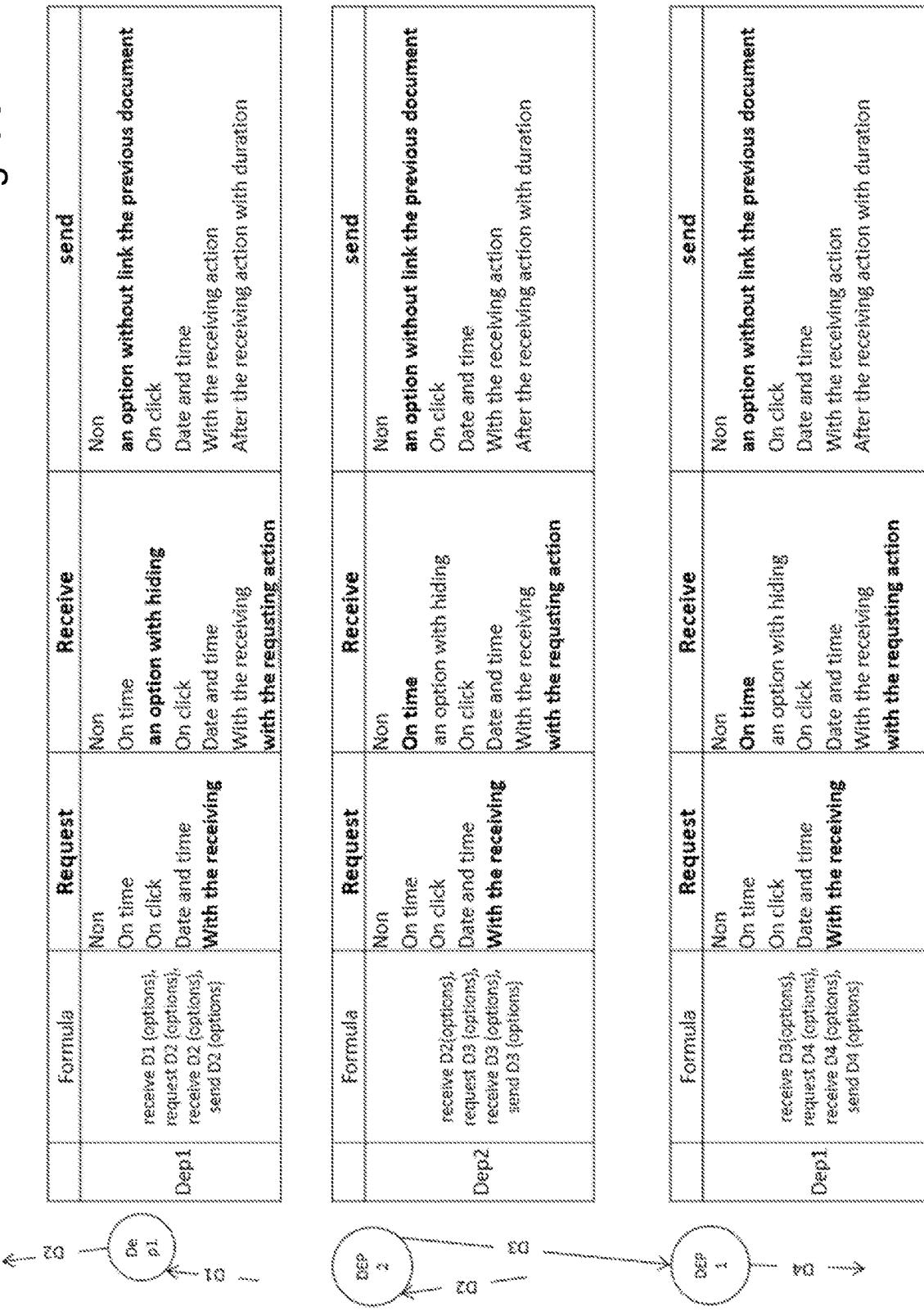
Figure 9H:
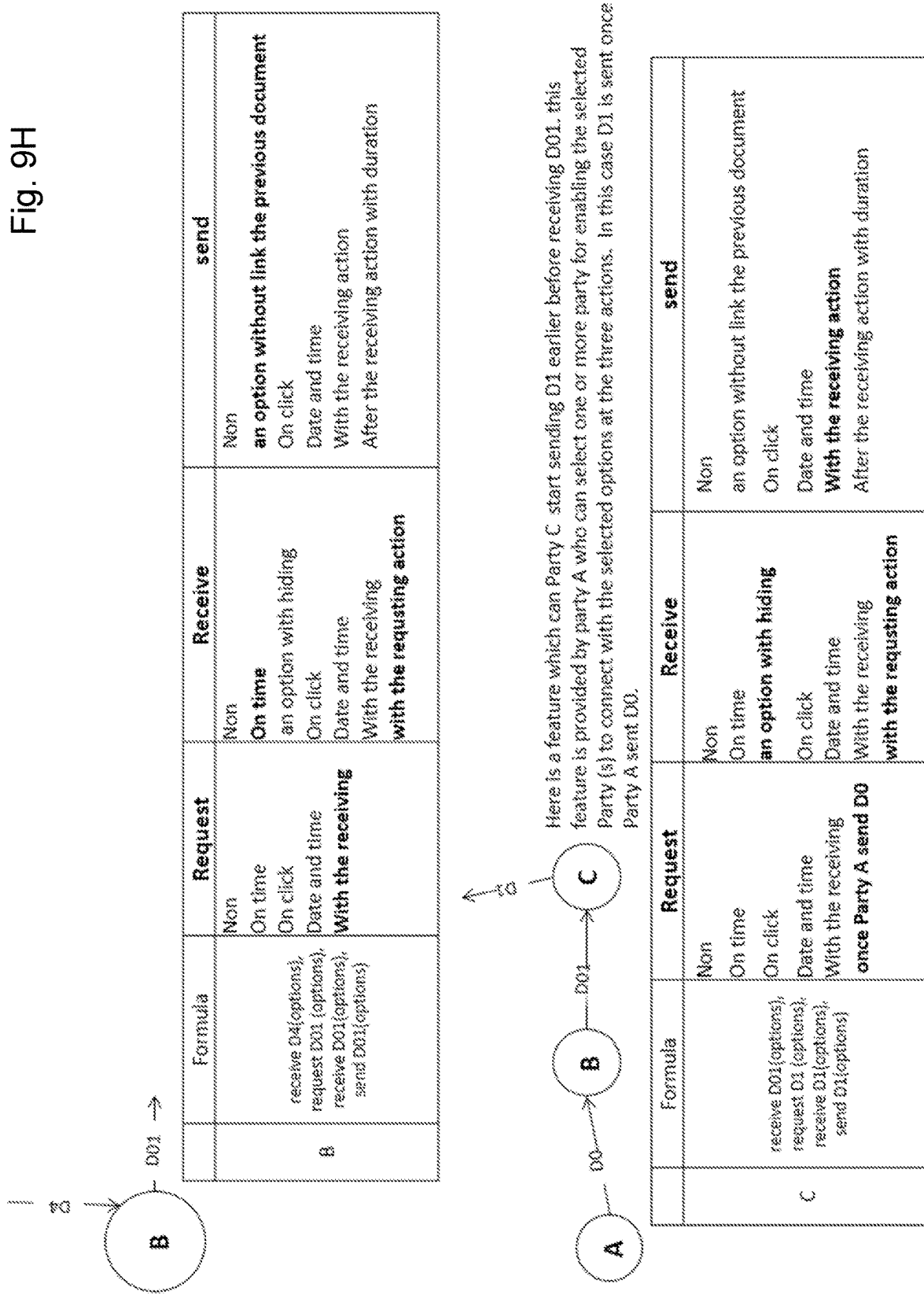
Figure 9I:
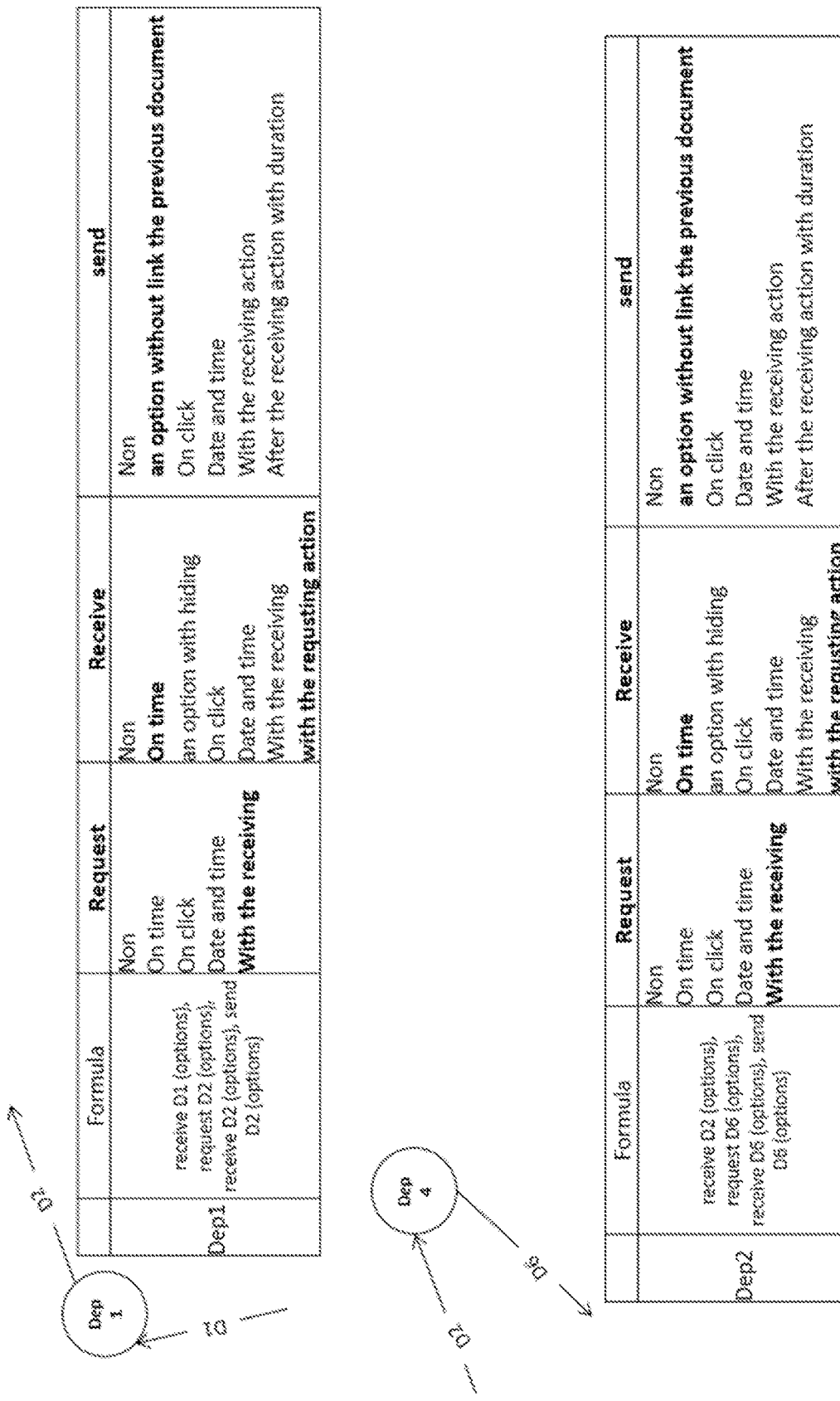
Figure 9J:
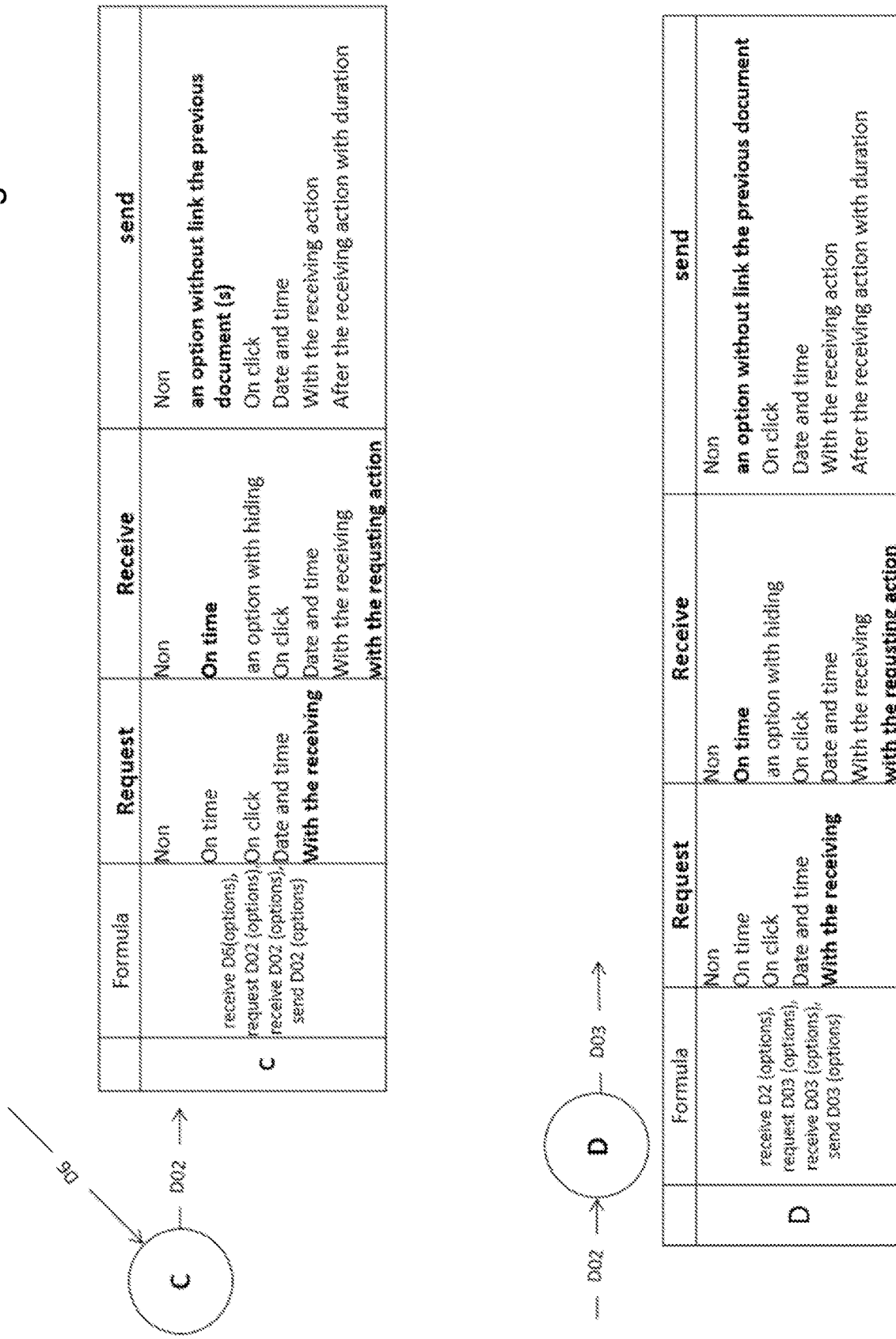

FIG. 8 is a basic flow chart of a method or operations according to one or more embodiments of the disclosed subject matter, implemented, for instance, using the communication apparatus 1000 of FIG. 1.

Optionally, in a step S80, a communication apparatus, such as communication apparatus 1000 (or system, apparatus or computer program product), can be provided.

In a step S85, an identifier may be provided. Generally speaking, the identifier may be a computer-readable pattern or arrangement, such as a bar code or a QR code.

At S90, a set up request to set up an input request may be provide by a first party. Additionally or alternatively, an input request may be received by a second party.

At S100, an input request may be generated, for instance, based on input information. Optionally, the input request can be or include one of a requester code and a receiver code, such as described herein.

In a step S110, an output reply can be generated based on the input request. Optionally, the output reply can be generated based on FIG. 4 and corresponding description above.

In a step S120, anti-counterfeit operations can be performed to the output reply prior to being output. For example, a unique bar code, watermark, embedded circuitry, and/or a digital signature can be added to the output reply, depending upon the physical or electronic format of the output reply, for instance, to show that authentication and integrity of the reply message, e.g., the output reply was not altered or modified. For example, insertion of the digital signature can be performed relying key generation instructions, signing instructions, and signature verifying instructions. The key generation instructions can randomly provide a private key and a corresponding public key, the signing instructions can produce a signature from the private key an a message, and the signature verifying instructions can from the public key and the signature either accept or reject the message.

In a step S130, the output reply can be output, for instance, as an official document or official data or information. For instance, hard and/or soft copies of the output reply can be provided.

In a step S140, which may be performed prior to or simultaneous with S130, the output reply can be archived, for instance, by the communication apparatus 1000. For example, a first soft copy of the output reply can be stored in memory of the communication apparatus 1000. Optionally or alternatively, another hard copy of the output reply can be generated and, for instance, placed into one bin of the plurality of bins of the communication apparatus 1000.

In a step S150, the first party and/or the second party can retrieve a supplementary copy of the output reply, wherein the supplementary copy of the output reply may be the hard copy archived in S140. The supplementary copy may be retrieved only by the first party, only by the second party, and/or only by a third party (e.g., a trusted courier), for instance, using a unique physical or electronic key to open the bin 1006.

Thus, certain aspects of the disclosed subject matter can comprise or provide:

A communication apparatus, the communication apparatus comprising: an input slot to receive an input request; a scanner to generate a soft copy of the input request; a controller configured to process the soft copy of the input reply and provide an output reply; a printer to print a first hard copy of the output reply and a second hard copy of the output reply; an output slot to dispense the first hard copy of the output reply; and a plurality of bins to store the second hard copy of the output reply.

The communication apparatus as described in the preceding paragraph, wherein the output reply includes an identifier and a digital signature.

The communication apparatus as described in the preceding paragraphs, wherein the identifier is an optical machine-readable representation of data.

The communication apparatus as described in the preceding paragraphs, wherein the controller is further configured to extract key inputs from the soft copy of the input request, and select a template from a plurality of templates based on the key inputs.

The communication apparatus as described in the preceding paragraphs, wherein the key inputs include at least one of a name, a date, an address, a document number, and an identification number.

The communication apparatus as described in the preceding paragraphs, wherein the input slot and the scanner are configured to provide a reading of physical identification documents.

The communication apparatus as described in the preceding paragraphs, wherein the controller is further configured to extract key identification elements from the reading of the physical identification documents.

The communication apparatus as described in the preceding paragraphs, wherein the physical identification documents includes at least one of a document issued by a government of a country and a payment card.

A communication apparatus, comprising: an input slot to receive an input request; an display and input device to input key inputs for the input request; a scanner to generate a soft copy of the input request; a controller configured to process the soft copy of the input request and provide an output reply; a printer to print a first hard copy of the output reply and a second hard copy of the output reply; an output slot to dispense the first hard copy of the output reply; and a plurality of bins to store the second hard copy of the output reply.

The communication apparatus as described in the preceding paragraph, wherein the output reply includes an identifier and a digital signature.

The communication apparatus as described in the preceding paragraphs, wherein the identifier is an optical machine-readable representation of data.

The communication apparatus as described in the preceding paragraphs, wherein the controller is further configured to select a template from a plurality of templates based on the key inputs.

The communication apparatus as described in the preceding paragraphs, wherein the key inputs include at least one of a name, a date, an address, a document number, an identification number.

The communication apparatus as described in the preceding paragraphs, wherein the input slot and the scanner are configured to provide a reading of physical identification documents.

The communication apparatus as described in the preceding paragraphs, wherein the controller is further configured to extract key identification elements from the reading of the physical identification documents.

The communication apparatus as described in the preceding paragraphs, wherein the physical identification documents includes at least one of a document issued by a government of a country and a payment card.

A method to generate an official communication with a communication apparatus, the method comprising: receiving a input request from a first party via an input slot of the communication apparatus; generating a soft copy of the input request via a scanner of the communication apparatus; generating an output reply from the soft copy of the input request via software instructions performed by a controller of the communication apparatus; inserting a digital signature on the output reply via software instructions performed by the controller; inserting an identifier on the output reply via software instructions performed by the controller; generating a first hard copy of the output reply and a second hard copy of the output reply with a printer of the communication apparatus; archiving the first hard copy in at least one bin of a plurality of bins of the communication apparatus; and dispensing the second hard copy through an output slot of the communication apparatus.

The method as described in the preceding paragraph, wherein the generating the output reply from the soft copy of the input request further includes: extracting key inputs from the soft copy of the request input; selecting a template from a plurality of templates based on the key inputs, each template of the plurality of templates including a plurality of fields to be filled by the key inputs; filling the plurality of fields with the key inputs to form the output reply; computing a completeness level of the output reply; and completing manually the output reply.

The method as described in the preceding paragraphs, wherein the selecting the template further includes assigning to each template of the plurality of templates a matching parameter.

The method as described in the preceding paragraphs, wherein the matching parameter indicates for each template how many field of the plurality of fields can be completed from the key inputs.

A non-transitory computer-readable storage medium storing computer-readable instructions that, when executed by a computer, cause the computer to perform a method as described in the preceding paragraphs.

An apparatus to generate and output an official communication document comprising: memory; and circuitry configured to receive an input request from a user requesting the official communication document, the input request including data comprised of one or more of a name, a date, an address, a document number, and an electronically readable pattern, transform the input request into a predetermined electronic format, select, responsive to the received input request, a predetermined official communication document template from among a plurality of predetermined official communication document templates stored in the memory, the predetermined official communication document template having a plurality of predefined portions for population with data, set the selected predetermined official communication document template as an intermediate official communication document having the predefined portions for population with data, determine which data of the input request with which to populate the predefined portions of the intermediate official communication document, populate a first portion of the predefined portions of the intermediate official communication document with the determined data of the input request, based on the received input request, receive data from a database, and populate a second portion of the predefined portions of the intermediate official communication document with data received from the database, determine whether the intermediate official communication document is sufficiently populated with the determined data of the input request and the data received from the database, when the intermediate official communication document is not sufficiently populated, output a request to the user to provide additional data to sufficiently populate the predefined portions of the intermediate official communication document, and receive the requested additional data until the predefined portions of the intermediate official communication document are sufficiently populated, when the predefined portions of the intermediate official communication document are sufficiently populated, electronically add a digital signature and document identification data to the intermediate official communication document to create a finalized official communication document, and output the finalized official communication document to the user as the official communication document.

The apparatus as described in the preceding paragraph, wherein the input request includes the electronically readable pattern, the electronically readable pattern being one or more of a bar code and a quick read (QR) code.

The apparatus as described in the preceding paragraphs, further comprising: an input port to receive the input request from the user, the input request being in the form of a physical object; a scanner configured to transform the input request into the predetermined electronic format; a printer to print the finalized official communication document; an output port to dispense the finalized official communication document to the user as the official communication document.

The apparatus as described in the preceding paragraphs, wherein the transforming the input request into the predetermined electronic format includes extracting from the input request key data in the form of the one or more of the name, the date, the address, the document number, and the electronically readable pattern.

The apparatus as described in the preceding paragraphs, wherein the input request is an electronic message sent by a portable electronic device of the user.

The apparatus as described in the preceding paragraphs, wherein the input request is a physical object either issued by a government entity or a financial institution or an incorporated entity.

The apparatus as described in the preceding paragraphs, wherein the intermediate official communication document is sufficiently populated with the determined data of the input request and the data received from the database when all of the predefined portions of the intermediate official communication document are populated.

The apparatus as described in the preceding paragraphs, wherein the finalized official communication document output to the user as the official communication document is output in electronic format to a portable electronic device of the user.

The apparatus as described in the preceding paragraphs, wherein the finalized official communication document output to the user as the official communication document is output in as a hardcopy in paper, paper-based, plastic, or plastic-based format.

The apparatus as described in the preceding paragraphs, wherein the finalized official communication document output to the user as the official communication document is output on a physical object provided as the input request.

The apparatus as described in the preceding paragraphs, wherein the additional data received in response to the request to the user to provide additional data to sufficiently populate the predefined portions of the intermediate official communication document constitutes part of the input request.

A method to generate and output an official communication document comprising: receiving an input request from a user requesting the official communication document, the input request including data comprised of one or more of a name, a date, an address, a document number, and an electronically readable pattern; transforming, using circuitry, the input request into a predetermined electronic format; selecting, using the circuitry, responsive to said receiving the input request, a predetermined official communication document template from among a plurality of predetermined official communication document templates stored in memory, the predetermined official communication document template having a plurality of predefined portions for population with data; setting, using the circuitry, the selected predetermined official communication document template as an intermediate official communication document having the predefined portions for population with data; determining, using the circuitry, which data of the input request with which to populate the predefined portions of the intermediate official communication document; populating, using the circuitry, a first portion of the predefined portions of the intermediate official communication document with the determined data of the input request; based on the received input request, using the circuitry, receiving data from a database, and populating a second portion of the predefined portions of the intermediate official communication document with data received from the database; determining, using the circuitry, whether the intermediate official communication document is sufficiently populated with the determined data of the input request and the data received from the database; when the intermediate official communication document is not sufficiently populated, outputting, using the circuitry, a request to the user to provide additional data to sufficiently populate the predefined portions of the intermediate official communication document, and receiving, using the circuitry, the requested additional data until the predefined portions of the intermediate official communication document are sufficiently populated; when the predefined portions of the intermediate official communication document are sufficiently populated, electronically adding, using the circuitry, a digital signature and document identification data to the intermediate official communication document to create a finalized official communication document; and outputting the finalized official communication document to the user as the official communication document.

The method as described in the preceding paragraph, wherein the input request includes the electronically readable pattern, the electronically readable pattern being one or more of a bar code and a quick read (QR) code.

The method as described in the preceding paragraphs, wherein said transforming the input request into the predetermined electronic format includes extracting from the input request key data in the form of the one or more of the name, the date, the address, the document number, and the electronically readable pattern.

The method as described in the preceding paragraphs, wherein the input request is an electronic message sent by a portable electronic device of the user.

The method as described in the preceding paragraphs, wherein the input request is a physical object either issued by a government entity or a financial institution or an incorporated entity.

The method as described in the preceding paragraphs, wherein the intermediate official communication document is sufficiently populated with the determined data of the input request and the data received from the database when all of the predefined portions of the intermediate official communication document are populated.

The method as described in the preceding paragraphs, wherein the finalized official communication document output to the user as the official communication document is output as one or more of in electronic format to a portable electronic device of the user, as a hardcopy in paper, paper-based, plastic, or plastic-based format, and on a physical object provided as the input request.

The method as described in the preceding paragraphs, wherein, when the predefined portions of the intermediate official communication document are not sufficiently populated, the intermediate official communication document is indirectly sent to an intermediate receiver, and the intermediate receiver manually populates the portions of the intermediate official communication document, and when the predefined portions of the intermediate official communication document are sufficiently populated, the official communication document is directly sent to a receiver account of the user via an electronic transmission.

A non-transitory computer-readable storage medium storing computer-readable instructions that, when executed by a computer, cause the computer to perform a method to generate and output an official communication document, the method comprising: transforming a received input request requesting the official communication document into a predetermined electronic format, the input request including data comprised of one or more of a name, a date, an address, a document number, and an electronically readable pattern; selecting, based on the input request, a predetermined official communication document template from among a plurality of predetermined official communication document templates stored in memory, the predetermined official communication document template having a plurality of predefined portions for population with data; setting the selected predetermined official communication document template as an intermediate official communication document having the predefined portions for population with data; determining which data of the input request with which to populate the predefined portions of the intermediate official communication document; populating a first portion of the predefined portions of the intermediate official communication document with the determined data of the input request; based on the received input request, receiving data from a database, and populating a second portion of the predefined portions of the intermediate official communication document with data received from the database; determining whether the intermediate official communication document is sufficiently populated with the determined data of the input request and the data received from the database; when the intermediate official communication document is not sufficiently populated, outputting a request to the user to provide additional data to sufficiently populate the predefined portions of the intermediate official communication document, and receiving the requested additional data until the predefined portions of the intermediate official communication document are sufficiently populated; when the predefined portions of the intermediate official communication document are sufficiently populated, electronically adding a digital signature and document identification data to the intermediate official communication document to create a finalized official communication document as the official communication document.

The non-transitory computer-readable storage medium as described in the preceding paragraph, further comprising electronically storing in one or more of the memory and the database the finalized official communication document as the official communication document.

A non-transitory computer-readable storage medium storing computer-readable instructions that, when executed by a computer, cause the computer to perform a method comprising: receiving an input request from a user requesting the official communication document, the input request including data comprised of one or more of a name, a date, an address, a document number, and an electronically readable pattern; transforming the input request into a predetermined electronic format; selecting responsive to said receiving the input request, a predetermined official communication document template from among a plurality of predetermined official communication document templates stored in memory, the predetermined official communication document template having a plurality of predefined portions for population with data; setting the selected predetermined official communication document template as an intermediate official communication document having the predefined portions for population with data; determining which data of the input request with which to populate the predefined portions of the intermediate official communication document; populating a first portion of the predefined portions of the intermediate official communication document with the determined data of the input request; based on the received input request receiving data from a database, and populating a second portion of the predefined portions of the intermediate official communication document with data received from the database; determining whether the intermediate official communication document is sufficiently populated with the determined data of the input request and the data received from the database; when the predefined portions of the intermediate official communication document are not sufficiently populated the intermediate official communication document is indirectly sent to an intermediate receiver, the intermediate receiver manually populates the portions of the intermediate official communication document; and when the predefined portions of the intermediate official communication document are sufficiently populated the official communication document is directly sent on a requester account of the user via an electronic transmission; and outputting the finalized official communication document to the user as the official communication document.

A non-transitory computer-readable storage medium storing computer-readable instructions that, when executed by a computer, cause the computer to perform a method comprising: receiving an input request from a user requesting an official document; determining whether the input request includes a requester code comprised of a requester account, subject and request or a receiver code comprised of a receiver account and requester subject and request or code; when said determining determines that the requester code is included in the input request, indirectly sending a finalized official document to the user by first sending an intermediate official document to a computer or apparatus operated by a human, who is different from the user, to add missing data to the intermediate official document prior to finalizing the official document and sending the finalized official document to the user; and when said determining determines that the receiver code is included in the input request, directly sending the finalized official document to the user without intervention by the human so long as the finalized official document includes full text for the finalized official document, otherwise, indirectly sending the finalized official document to the user by first sending the intermediate official document to the computer or apparatus operated by the human to add missing data to the intermediate official document prior to finalizing the official document, wherein, prior to sending to the user, the finalized official document is modified to include a digital signature.

In addition, certain aspects of the disclosed subject matter can also comprise or provide:

A communication apparatus to manage a formal correspondence between at least two parties; a first communication is between a first party (as a requester) and his apparatus to generate a first party document (request), the communication apparatus comprising: an input slot to insert a card reader, a keypad to operate the first party account, a display or touch screen to select the second party account and a set of instructions, a keyboard to write and modify the document, a memory, a circuitry, optionally, an input port to insert a paper or an appropriate material for the input request; a scanner to generate a soft copy of the inserted material (the first party document); a controller configured to process the soft copy of the input reply inserted material and provide an output reply (the second party document); a printer to print a first hard copy of the output reply and a second hard copy of the output reply the first party document and the second party document; an output slot to dispense the first hard copy of the output reply second party document; and a plurality of bins to store the second hard copy of the output reply inserted material.

The communication apparatus as described in the preceding paragraph, wherein the output reply includes an identifier, a digital signature and the accounts of the involved parties.

The communication apparatus as described in the preceding paragraphs, wherein the identifier is an optical machine-readable representation of data.

The communication apparatus as described in the preceding paragraphs, wherein an independent third party authorized to create the first party account.

The communication apparatus as described in the preceding paragraphs, the inserted card is associated with the first party account.

The communication apparatus as described in the preceding paragraphs, wherein the independent third party can authorize a kind of communication between the first party and the second party.

The communication apparatus as described in the preceding paragraphs, wherein the second party account can be selected via the keypad and the touch screen, and using the keypad or the keyboard for inputting key inputs to extract a predetermined official document.

The communication apparatus as described in the preceding paragraphs, wherein the predetermined official document can be write and modified via the keyboard.

The communication apparatus as described in the preceding paragraphs, wherein one of the key inputs is a unique requester code associated with the predetermined official document.

The communication apparatus as described in the preceding paragraphs, wherein the unique requester code comprises of the first party account, the document name, the document number, the document date, an address of the document an identification number, in addition, the second party account.

The communication apparatus as described in the preceding paragraphs, wherein the predetermined official document can be automatically identified and extracted to the first party after inputting the unique requester code in the input request.

The communication apparatus as described in the preceding paragraphs, wherein the predetermined official document having a full amount of text or a partial amount of text.

The communication apparatus as described in the preceding paragraphs, wherein the predetermined official document also having a partial of predefined portions for population with data.

The communication apparatus as described in the preceding paragraphs, wherein the predefined portions can be defined by the first party and used for any additional data or change in the text content.

The communication apparatus as described in the preceding paragraphs, wherein if the predetermined official document having a full amount of text; sending the document to the second party is a priority, and if the predetermined official document having a partial amount of text or the predefined portions are not sufficiently populated; a request can automatically output to the first party to populate the predefined portions.

The communication apparatus as described in the preceding paragraphs, wherein a part of the input request is to add key word(s), key sentence(s), the first party can input a key word(s), and/or key sentence(s) in the predefined portions and receive data based on the inputted key word (s) or key sentences (s).

The communication apparatus as described in the preceding paragraphs, wherein if the predefined portions have sufficiently populated, sending the official communication document to the second party is a priority.

The communication apparatus as described in the preceding paragraphs, wherein the first party can determine the way of requesting the document, the way of receiving the requested document from the database, and the way of sending the document to the second party, either be directly in a fully automatic way, i.e., without any manual intervention, or indirectly in a partially automatic way, i.e., with manual intervention The communication apparatus as described in the preceding paragraphs, wherein if the direct option was determined, the first party can set a date and time to request the document from the database, set a date and time to receive the requested document from the database, set a date and time to send the document to the second party The communication apparatus as described in the preceding paragraphs, wherein sending the official communication document directly at the determined date and time.

The communication apparatus as described in the preceding paragraphs, wherein if the indirect option was determined, the first party with a mouse clicking can request the official document from the memory of his apparatus; receive the requested document, send the official communication document to the second party.

A second communication is between the second party (as a receiver) and his apparatus to generate a reply official document responsive to the first party document, the communication apparatus comprising: an input slot to insert a card reader, a keypad to operate the second party account and a set of instructions, a display or touch screen to select the first party account, a keyboard to modify the document, a memory, a circuitry, optionally, an input port to insert a paper or an appropriate material for the input request, a scanner to generate a soft copy of the input request and provide an output reply (the first party document); a printer to print the first party document and the second party document; an output slot to dispense the first party document of the output reply; and a plurality of bins to store the second party document.

The communication apparatus as described in the preceding paragraph, wherein the output reply includes an identifier, a digital signature and the accounts of the involved parties.

The communication apparatus as described in the preceding paragraphs, wherein the identifier is an optical machine-readable representation of data.

The communication apparatus as described in the preceding paragraphs, wherein the independent third party authorized to create the second party account.

The communication apparatus as described in the preceding paragraphs, wherein the inserted card associated with the second party account.

The communication apparatus as described in the preceding paragraphs, wherein the independent third party can authorize the kind of the communication between the first party and the second party.

The communication apparatus as described in the preceding paragraphs, wherein the first party account can be selected via the keypad and the touch screen, and using the keypad, and/or the keyboard for inputting key inputs to extract a predetermined official document.

The communication apparatus as described in the preceding paragraphs, wherein a set of key inputs for extracting a predetermined official document can be entered via the keypad, touch screen, and the keyboard.

The communication apparatus as described in the preceding paragraphs, wherein the controller is further configured to extract key identification elements from the reading of the physical identification documents, one of the key inputs is a unique receiver code associated with a predetermined official document.

The communication apparatus as described in the preceding paragraphs, wherein the unique receiver code comprises of the second party account, document name, document number, document date, an address of the document an identification number; in addition, the unique requester code associated with the first party document.

The communication apparatus as described in the preceding paragraphs, wherein the second party can prepare his reply document prior receiving the first party document where: the method comprising: once the first party creates the unique requester code of the first party document, such unique code can automatically display in the second party apparatus.

The communication apparatus as described in the preceding paragraphs, wherein displaying the unique requester code associated with first party document in the second party apparatus depends on authorizing the formal correspondence between the first party and the second party, a node or VPN to connect or access between the two apparatuses.

The communication apparatus as described in the preceding paragraphs, wherein the unique code associated with the first party document connects with the unique code associated with the reply document of the second party.

The communication apparatus as described in the preceding paragraphs, wherein the unique code of the first party document and the unique code of the first party document have been connected, the received document from the first party can automatically extract the reply official document from the memory of the second party apparatus and display such document to the second party.

The communication apparatus as described in the preceding paragraphs, wherein the two official documents can be displayed in the second party apparatus in one electronic format and one file.

The communication apparatus as described in the preceding paragraphs, wherein inputting the unique receiver code in the input request can automatically identify and extract the predetermined official document to the second party.

The communication apparatus as described in the preceding paragraphs, wherein the predetermined official document having a full amount of text or a partial amount of text.

The communication apparatus as described in the preceding paragraphs, wherein the predetermined official document also having a plurality of predefined portions for any change may require, and/or for adding additional data.

The communication apparatus as described in the preceding paragraphs, wherein if the predetermined official document has a full amount of text; sending the document to the first party is a priority, and if the predetermined official document has a partial amount of text or the predefined portions are not sufficiently populated; a request can automatically output to the first party to populate the predefined portions.

The communication apparatus as described in the preceding paragraphs, wherein part of the input request is to add key word(s), and/or key sentence(s), the first party can input a key word, and/or key sentence in the predefined portions and receive data based on the inputted key word(s), and/or key sentence(s).

The communication apparatus as described in the preceding paragraphs, wherein if the predefined portions have sufficiently populated; sending the official communication document to the first party is a priority.

The communication apparatus as described in the preceding paragraphs, wherein the first party can determine the way of requesting the document, the way of receiving the requested document from the database, and the way of sending the document to the first party, either be directly in a fully automatic way, i.e., without any manual intervention, or indirectly in a partially automatic way, i.e., with manual intervention The communication apparatus as described in the preceding paragraphs, wherein if the predetermined official document having a fully amount of text and the direct option was determined, the connected documents can be received in the second party apparatus and displayed to the second party at the time of receiving the first party document, or the second party can set a date and time to receive and display the connected documents, for the sending action; the reply official document can be sent directly at the time of receiving the first party document, or the second party can set a date and time to send the reply official document to the first party.

The communication apparatus as described in the preceding paragraphs, wherein sending the reply official communication document to the first party directly at the determined way.

The communication apparatus as described in the preceding paragraphs, wherein the first party with his apparatus can receive and display the reply document at the same time as sent from the second party, or, the first party can set a date and time to receive the reply document.

The communication apparatus as described in the preceding paragraphs, wherein if the indirect option was determined, the first party with a mouse clicking can request the official document from the memory of his apparatus; receive the requested document; send the official communication document to the second party.

The communication apparatus as described in the preceding paragraphs, wherein the received document from the second party can extract the first party document from the memory of the first party apparatus and display such document to the first party.

The communication apparatus as described in the preceding paragraphs, wherein the two official documents can be displayed in the first party apparatus in one electronic format and one file.

The communication apparatus as described in the preceding paragraphs, wherein the first party and/or the second party, alternatively, as another option, can use the external slots of his/their apparatus(s), the method of the communication apparatus comprising: receiving an input request from a the first party via the input port of his communication apparatus by inserting an external paper or an appropriate material in the input port, said material includes electronically readable pattern, the electronically readable pattern contains a unique requester code associated with a predetermined official document, said predetermined document indicates to the first party document; generating a soft copy of the input request via a scanner of the communication apparatus, generating an output reply (the first party document) from the soft copy of the input request via software instructions performed by a controller of the communication apparatus; transferring the input request into a predetermined electronic format, automatically displaying the first party document; inserting a digital signature on the output reply via software instructions performed by the controller; inserting an identifier on the output reply via software instructions performed by the controller; sending such document directly (on a date and time) or indirectly (on click) to the second party apparatus; the received document can automatically generate the reply official document (the second party document) where the unique code of the first party document is automatically connected with the unique code of the second party document; generating the reply document from the second party apparatus; the reply document can be automatically received in the apparatus of the first party within a permission from the second party; archiving the inserted material in at least one bin of a plurality of bins of the communication apparatus; and dispensing the second party document through an output slot of the communication apparatus.

The apparatus as described in the preceding paragraph, wherein the inserted material can be a paper or plastic (or some other material, such as rubber, cardboard, electronics, metal or combination of materials) document, card, sheet or three-dimensional object.

The apparatus as described in the preceding paragraphs wherein the generating the output reply from the soft copy of the input request further includes: extracting key inputs from the soft copy of the request input; selecting a template from a plurality of templates based on the key inputs, each template of the plurality of templates including a plurality of fields to be filled by the key inputs; filling the plurality of fields with the key inputs to form the output reply; computing a completeness level of the output reply; and completing manually the output reply.

The apparatus as described in the preceding paragraphs wherein the selecting the template further includes assigning to each template of the plurality of templates a matching parameter.

The apparatus as described in the preceding paragraphs wherein the matching parameter indicates for each template how many field of the plurality of fields can be completed from the key inputs.

The apparatus as described in the preceding paragraphs, wherein the unique code of the first party document can be automatically displayed in the second party apparatus, displaying said unique code via a VPN or a node connecting the two apparatus.

The apparatus as described in the preceding paragraphs, wherein the received document of the first party document can automatically extract the reply document from the memory of the second party apparatus to the second party, and the received document of the second party document can automatically extract the first party document to the first party.

The apparatus as described in the preceding paragraphs, wherein displaying the two documents to the first party and the second party in one electronic format and one file.

The apparatus as described in the preceding paragraphs wherein the input request includes the electronically readable pattern, the electronically readable pattern being one or more of a bar code and a quick read (QR) code.

The apparatus as described in the preceding paragraphs, further comprising: an input port to receive the input request from the user, the input request being in the form of a physical object; a scanner configured to transform the input request into the predetermined electronic format; a printer to print the finalized official communication document; an output port to dispense the finalized official communication document to the user as the official communication document.

The apparatus as described in the preceding paragraphs, can automatically manage and generate official messages, e.g., official letters and/or documents in standardized format and/or with anti-counterfeit measures (e.g., unique bar code, watermark, embedded circuitry).

The apparatus as described in the preceding paragraphs, wherein the input request is an electronic message sent by a portable electronic device of the user.

The communication apparatus as described in the preceding paragraphs, wherein the first party document receiving in the second party apparatus as a completed official document, and the second party document receiving in the first party apparatus as a completed official document.

A method to manage a formal correspondence between two or more different parties, to generate an official communication document with a communication apparatus, where an independent account of the first party and independent account of the second party have been created by the independent third party, also the kind of a communication has been authorized via the independent third party, authorizing said communication based on a formal correspondence between the first party and the second party, the method of the communication apparatus comprising: receiving an input request via a keyboard, keypad, touch screen of the apparatus, or optionally via inserting external appropriate material in the second input slot; inserting a card via a first input slot to identification the user; operating the first party account; selecting the second party account, determining a set of key data to create a unique code associated with a document which is as follows: saving said document into the memory as a predetermined or intermediate official document; inputting the unique code associated with the predetermined official document, automatically displaying the requested document to the first party, determining a direct option or indirect option to set up the way to request the document from the database, the way to receive the requested document, the way to send the document to the second party either be directly in a fully automatic way or indirectly in a partially automatic way, if the direct option was determined, set a date and time to request the document from the database, set a date and time to receive the requested document, set a date and time to send the document to the second party; sending automatically the document to the second party at the determined way; the method with the second party and his apparatus comprising: the second party as (the receiver) can create the receiver unique code associated with the reply document prior receiving the first party document, where once the requester unique code of the first party has been created by the first party, said requester unique code can directly display in the second party apparatus, where said unique requester code is one of a key inputs to create the receiver unique code of the second party document, determining the key inputs which are as follows: saving said document into the memory as a predetermined or intermediate official document, after that, the unique receiver code is automatically created; inputting the unique receiver code associated with the predetermined official document; automatically connect the first party document with the second party document; automatically displaying the connected documents to the second party; determining a direct option or the indirect option to set up the way to request the document from the database, the way to receive the requested document, the way to send the document to the first party either be directly in a fully automatic way or indirectly in a partially automatic way, if the direct option was determined, receive and display the connected documents at the time of receiving the first party document, or set a date and time to receive and display the connected documents, for the sending action; send the reply official document at the time of receiving the first party document, or set a date and time to send the reply official document to the first party; sending automatically the reply document to the first party at the determined way.

The method as described above wherein the input request includes the electronically readable pattern, the electronically readable pattern being one or more of a bar code and a quick read (QR) code.

A non-transitory computer-readable storage medium storing computer-readable instructions that, when executed by a computer, cause the computer to perform a method as described above.

An apparatus to generate and output an official communication document comprising: memory; and circuitry configured to receive an input request from a user requesting the official communication document, the input request including data comprised of one or more of a name, a date, an address, a document number, and an electronically readable pattern, transform the input request into a predetermined electronic format, select, responsive to the received input request, a predetermined official communication document template from among a plurality of predetermined official communication document templates stored in the memory, the predetermined official communication document template having a plurality of predefined portions for population with data, set the selected predetermined official communication document template as an intermediate official communication document having the predefined portions for population with data, determine which data of the input request with which to populate the predefined portions of the intermediate official communication document, populate a first portion of the predefined portions of the intermediate official communication document with the determined data of the input request, based on the received input request, receive data from a database, and populate a second portion of the predefined portions of the intermediate official communication document with data received from the database, determine whether the intermediate official communication document is sufficiently populated with the determined data of the input request and the data received from the database, when the intermediate official communication document is not sufficiently populated, output a request to the user to provide additional data to sufficiently populate the predefined portions of the intermediate official communication document, and receive the requested additional data until the predefined portions of the intermediate official communication document are sufficiently populated, when the predefined portions of the intermediate official communication document are sufficiently populated, electronically add a digital signature and document identification data to the intermediate official communication document to create a finalized official communication document, and output the finalized official communication document to the user as the official communication document.

The apparatus as described in the preceding paragraphs, further comprising: an input port to receive the input request from the user, the input request being in the form of a physical object; a scanner configured to transform the input request into the predetermined electronic format; a printer to print the finalized official communication document; an output port to dispense the finalized official communication document to the user as the official communication document.

The apparatus as described in the preceding paragraphs, which can automatically manage and generate official messages, e.g., official letters and/or documents in standardized format and/or with anti-counterfeit measures (e.g., unique bar code, watermark, embedded circuitry).

The apparatus as described in the preceding paragraphs, wherein the input request is an electronic message sent by a portable electronic device of the user.

The apparatus as described in the preceding paragraphs, wherein the input request is a physical object either issued by a government entity or a financial institution or an incorporated entity.

The apparatus as described in the preceding paragraphs, wherein the intermediate official communication document is sufficiently populated with the determined data of the input request and the data received from the database when all of the predefined portions of the intermediate official communication document are populated.

The apparatus as described in the preceding paragraphs, wherein the finalized official communication document output to the user as the official communication document is output in electronic format to a portable electronic device of the user.

The apparatus as described in the preceding paragraphs, wherein the finalized official communication document output to the user as the official communication document is output in as a hardcopy in paper, paper-based, plastic, or plastic-based format.

The apparatus as described in the preceding paragraphs, wherein the finalized official communication document output to the user as the official communication document is output on a physical object provided as the input request.

The apparatus as described in the preceding paragraphs, wherein the additional data received in response to the request to the user to provide additional data to sufficiently populate the predefined portions of the intermediate official communication document constitutes part of the input request.

A method to generate and output an official communication document comprising: receiving an input request from a user requesting the official communication document, the input request including data comprised of one or more of a name, a date, an address, a document number, and an electronically readable pattern; transforming, using circuitry, the input request into a predetermined electronic format; selecting, using the circuitry, responsive to said receiving the input request, a predetermined official communication document template from among a plurality of predetermined official communication document templates stored in memory, the predetermined official communication document template having a plurality of predefined portions for population with data; setting, using the circuitry, the selected predetermined official communication document template as an intermediate official communication document having the predefined portions for population with data; determining, using the circuitry, which data of the input request with which to populate the predefined portions of the intermediate official communication document; populating, using the circuitry, a first portion of the predefined portions of the intermediate official communication document with the determined data of the input request; based on the received input request, using the circuitry, receiving data from a database, and populating a second portion of the predefined portions of the intermediate official communication document with data received from the database; determining, using the circuitry, whether the intermediate official communication document is sufficiently populated with the determined data of the input request and the data received from the database; when the intermediate official communication document is not sufficiently populated, outputting, using the circuitry, a request to the user to provide additional data to sufficiently populate the predefined portions of the intermediate official communication document, and receiving, using the circuitry, the requested additional data until the predefined portions of the intermediate official communication document are sufficiently populated; when the predefined portions of the intermediate official communication document are sufficiently populated, electronically adding, using the circuitry, a digital signature and document identification data to the intermediate official communication document to create a finalized official communication document; and outputting the finalized official communication document to the user as the official communication document.

A computerized method, to manage a formal correspondence between two or more different parties, where a request document from a first party can be directly or indirectly requested, received and sent to the second party, a reply document from a second party can be directly or indirectly requested, received, and sent to the first party as a responsive and corresponding to the request document in an automatic, secure and efficient way; said method comprising: authorize the communication; an independent third party can create an independent account to the first party and an independent account to the second party, and authorize the kind of a communication between them, the first party as a requester can communicate his apparatus to generate and send an official document to the second party, starting with: extracting, using circuitry, an official document from the database via inputting an input request, the input request includes a unique requester code associated with a predetermined official document, transform the input request into a predetermined electronic format, automatically display, responsive to the received input request, a predetermined official communication document from among of a plurality of predetermined official document templates stored in the memory; determining, either being direct option or indirect option, using the circuitry, the way of requesting the document, the way of receiving the requested document from the database, and the way of sending the document to the second party, either be directly in a fully automatic way, i.e., without any manual intervention, or indirectly in a partially automatic way, i.e., with manual intervention, setting; if the direct option was determined, a date and time to request, receive, and send the official document, or if the indirect option was determined, click manual to request, receive, send the official document; checking, prior to sending the official document to the second party, if the predetermined official document having a full amount of text and no change is required, sending the official document to the second party is a priority, if the predetermined official document having a partial amount of text or change may require, a request can automatically output to the first party to add additional data; populating, the predefined portions where a part of the input request is to add key word(s), and/or key sentence(s) for adding additional data or change the text content; receiving data from the database based on the inputted key word(s), and/or key sentence(s); a second communication between the second party as a receiver and his apparatus to generate and send a reply document to the first party, starting with; extracting, using circuitry, a document from the database via inputting an input request, the input request includes a unique receiver code associated with a predetermined official document, the predetermined official document having a full or a partial amount of text; connecting, using the circuitry, the unique requester code associated with the first party document with the unique receiver code associated with the second party document; determining, using the circuitry, the way of requesting the reply document, the way of receiving the requested document from the database, and the way of sending the reply document to the first party, either be directly or indirectly, determining and setting; if a direct option was determined or indirect option was determined, if the direct option was determined, using the circuitry, for the requesting action; set a date and time of requesting the reply document from the database; or set requesting the reply document at the time of receiving the first party document, for the receiving action; set a date and time of receive the reply document from the database; or set receiving and display the reply document at the time of receiving the first party document, for the sending action; set a date and time to send the reply document to the first party; or set sending the reply document at the time of receiving the first party document; checking, whether by the first party in the request document or by the second party in the reply document prior to sending the official document to the other party, if the predetermined official communication document template having a full or partial amount of text, if the predetermined official document having a full amount of text; send the official document to the other party, if the predetermined official document having a partial amount of text or change is required; inputting, at the predefined portions a key word(s), and/or key sentence(s); automatically receiving data from the database based on the inputted key word(s), and/or key sentence(s); finalizing the document, populate the predefined portions with the received data or directly from the user until the document is sufficiently populated; sending the finalized official document to the other party at the determined way.

The method as described in the preceding paragraphs wherein the independent third party authorized to create an independent account of the first party and an independent account of the second party, and the independent third party can authorize the kind of a communication between the parties based on a formal correspondence between them.

The method as described in the preceding paragraphs, wherein the first party as a requester can generate his document to be sent to the second party; generating such document is relying on creating a unique requester code associated with a predetermined document (the first party document), where the unique requester code comprises of [the first party account, document subject, document name, document number, document date, and an electronically readable pattern; in addition, the second party account].

The method as described in the preceding paragraphs, wherein the document of the second party is generated by the second party as a responsive and corresponding to the first party document; generating such document is relying on creating a unique receiver code associated with a predetermined document (the second party document) where the unique receiver code comprises of [the second party account, document subject, document name, document number, document date, and electronically readable pattern; in addition, the unique requester code of the first party document.

The method as described in the preceding paragraphs, wherein the unique requester code associated with the first party document is one of the key inputs to create the unique receiver code associated with the second party document where the two documents are connected together.

The method as described in the preceding paragraphs, wherein the two documents have been linked to each other, the received first party document can automatically extract the reply document from the memory of the second party apparatus and display the two documents to the second party, and the received reply document can automatically extract the first party document from the memory of the first party apparatus and display the two documents to the first party.

The method as described in the preceding paragraphs, wherein displaying the two documents in one electronic format and one file.

The method as described in the preceding paragraphs wherein the second party can prepare his document prior receiving the first party document; the method comprising: once the first party creates the unique requester code, the code created can be directly displayed in the apparatus of the second party via a VPN or a node connecting the two apparatus.

The method as described in the preceding paragraphs, wherein if the direct option was determined, the first party can set a date and time of requesting the document from the database, set a date and time of receiving the requested document from the database, set a date and time to send the document to the second party.

The method as described in the preceding paragraphs, wherein if the indirect option was determined, the user can use a mouse clicking to request the official document from the memory of his apparatus; to receive the requested document; to send the official communication document to the second party.

The method as described in the preceding paragraphs, wherein the input request includes the electronically readable pattern, the electronically readable pattern being one or more of a bar code and a quick read (QR) code.

The method as described in the preceding paragraphs, which can automatically manage and generate official messages, e.g., official letters and/or documents in standardized format and/or with anti-counterfeit measures (e.g., unique bar code, watermark, embedded circuitry).

The method as described in the preceding paragraphs, wherein the input request is an electronic message sent by a portable electronic device of the user.

The method as described in the preceding paragraphs, wherein the input request is a physical object either issued by a government entity or a financial institution or an incorporated entity. the user can populating his document with the required text and define the predefined portions for any change or adding additional data in the text content, and saving the document as a predetermined and an intermediate official communication document or intermediate document.

The method as described in the preceding paragraphs, wherein the intermediate official communication document template having fully or partly amount of text, also having predefined portions for any change in the text content, if the intermediate official document having a full amount of text, sending the document to the other party is a priority, if the intermediate document having a partial amount of text or the predefined portions are not completed, adding a key word(s), and/or key sentence(s) at the predefined portions and receiving data from the database based on the entered key word(s), and/or key sentence(s).

The method as described in the preceding paragraphs, wherein the intermediate official communication document is sufficiently populated with the determined data of the input request and the data received from the database when all of the predefined portions of the intermediate official communication document are populated.

The method as described in the preceding paragraphs, wherein the finalized official communication document output to the user as the official communication document is output as one or more of in electronic format to a portable electronic device of the user, as a hardcopy in paper, paper-based, plastic, or plastic-based format, and on a physical object provided as the input request.

The method as described in the preceding paragraphs, wherein, when the predefined portions of the intermediate official communication document are not sufficiently populated, the intermediate official communication document is directly sent to the user, and the user manually populates the portions of the intermediate official communication document, and when the predefined portions of the intermediate official communication document are sufficiently populated, the official communication document is directly (on a date and time) or indirectly (on click) sent to the other party via an electronic transmission.

A non-transitory computer-readable storage medium storing computer-readable instructions that, when executed by a computer, cause the computer to perform a method to generate and output an official communication document, the method comprising: transforming a received input request requesting the official communication document into a predetermined electronic format, the input request including data comprised of one or more of a name, a date, an address, a document number, and an electronically readable pattern; selecting, based on the input request, a predetermined official communication document template from among a plurality of predetermined official communication document templates stored in memory, the predetermined official communication document template having a plurality of predefined portions for population with data; setting the selected predetermined official communication document template as an intermediate official communication document having the predefined portions for population with data; determining which data of the input request with which to populate the predefined portions of the intermediate official communication document; populating a first portion of the predefined portions of the intermediate official communication document with the determined data of the input request; based on the received input request, receiving data from a database, and populating a second portion of the predefined portions of the intermediate official communication document with data received from the database; determining whether the intermediate official communication document is sufficiently populated with the determined data of the input request and the data received from the database; when the intermediate official communication document is not sufficiently populated, outputting a request to the user to provide additional data to sufficiently populate the predefined portions of the intermediate official communication document, and receiving the requested additional data until the predefined portions of the intermediate official communication document are sufficiently populated; when the predefined portions of the intermediate official communication document are sufficiently populated, electronically adding a digital signature and document identification data to the intermediate official communication document to create a finalized official communication document as the official communication document.

FIGS. 9A-9K is a multi-page illustration 900 of an example of a four-party communication, with different steps of the communication broken out on separate pages, using one or more embodiments of the disclosed subject matter. The goal of the disclosed communication methods, achieved as illustrated in FIGS. 9A-9K, is shortening the gap between the demand time and the supply time or reaching the demand time to be equal to the supply time in order to deliver a document or an item.

FIG. 10 is an illustration 1000 of an example of a two-party communication where documents are exchanged without human intervention, according to one or more embodiments of the disclosed subject matter. In FIG. 10, the first party apparatus and the second party apparatus handle the communication actions (sending, receiving, etc.) automatically, as all required information and data is available, thus eliminating the need for action by the first and second parties themselves.

The apparatuses, methods, and computer program products described above are directed to automatically manage, generate and send official documents, between two or more parties; generating a document depends on connecting a reply document code with a request document code, depends on determining the way of requesting the document from the database, the way of receiving the requested document, the way of sending the said document to another party, and the way of receiving a document from another party, which can be either directly in a fully automatic way, i.e., without any manual intervention, or indirectly in a partially automatic way, i.e., with manual intervention (a mouse clicking), and, the apparatus, method, and computer product can also be configured to determine the primary purpose and emergency of the official documents between the different involved parties; determining the primary and emergency document between the different parties documents in case if the direct option was determined, can be as follows: requesting a document from the database before, or after, or with another document or on a date and time; receiving a document from the database to be displayed to the user before or after, or with another document, or on a date and time; sending a document to another party before or after, or with another document, or on a date and time, and also, requesting a document from the database before, or after, or with receiving a document from another party; receiving and displaying a document to the user before or after, or with receiving a document from another party; sending a document to another party before, or after, or with receiving a document from the other party.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure, are within the scope of one of ordinary skill in the art, and are contemplated as falling within the scope of the disclosed subject matter and any equivalents thereto. Features of the disclosed embodiments can be combined, rearranged, omitted, etc., within the scope of the disclosed subject matter to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

What is claimed is:

1. A communication apparatus to manage a formal correspondence between at least two parties, where a request document from a first party is directly or indirectly generated, received, and sent to a second party, a reply document from the second party is directly or indirectly generated, received, and sent to the first party responsive and corresponding to the request document, the communication apparatus comprising:

an input slot to insert a card to identify a user, a keypad to operate a first party account, a display or touch screen display to select a second party account and a set of instructions, a mouse and a keyboard to edit documents, a memory, a circuitry, an input port to insert material, a scanner to generate a soft copy of the inserted material as a first party document; a controller configured to process a soft copy of the inserted material and provide an output reply as a second party document; a printer to print the first party document and the second party document; an output slot to dispense the second party document; and a plurality of bins to store the inserted material, where the first party or the second party inputs a request via the keyboard and the mouse, or via inserting an appropriate material into the input port, where the circuitry is configured to;

receive an input request from the first party as a requester requesting the apparatus to generate the request document, the input request including a unique requester code associated with a predetermined official document stored in the memory, where the unique requester code comprises the first party account, a document subject, a document name, a document number, a date, a sender or receiver, an electronically readable pattern and the second party account, transform the input request into a predetermined electronic format, automatically display, responsive to the received input request, a predetermined official communication document template from among a plurality of predetermined official communication document templates stored in the memory, the predetermined official communication document template having a full or partial amount of text and having a plurality of predefined portions for population with data, the predefined portions usable for adding additional data or changing a part of the text, set the displayed predetermined official communication document template as an intermediate official communication document having the predefined portions for population with data, determine a mode of operation for the request document, either a direct option which operates in a fully automatic way without any manual intervention, or an indirect option which operates in a partially automatic way with manual intervention, when the direct option was determined, setting a mode of operation for each action where a requesting action is determined to request the request document from database via options including by date and time, and by the mouse and the keyboard and, a receiving action is determined to receive the request document from the database via options including with the requesting action, by date and time, an option with hiding, and by the mouse and the keyboard, a sending action is determined to send the request document to the second party via options including by date and time, with the receiving action, after the receiving action with duration, an option without linking the previous document, and by the mouse and the keyboard, when the indirect option was determined, selecting an option for each of the requesting, receiving and sending actions by manual intervention via the mouse and the keyboard, check prior to sending the request document to the second party, if the predetermined official communication document has a full amount of text, when the predetermined official communication document has a partial amount of text or change is required, add a key word(s), and/or key sentence(s), determine which data of the input request with which to populate the predefined portions of the intermediate official communication document, populate a first portion of the predefined portions of the intermediate official communication document with the determined data of the input request, based on the received input request, receive data from a database, and populate a second portion of the predefined portions of the intermediate official communication document with data received from the database, determine whether the intermediate official communication document is sufficiently populated with the determined data of the input request and the data received from the database, wherein the intermediate official communication document is sufficiently populated when all of the predefined portions of the intermediate official communication document are populated, when the intermediate official communication document is not sufficiently populated, output a request to the first party to provide additional data to sufficiently populate the predefined portions of the intermediate official communication document, and receive the requested additional data until the predefined portions of the intermediate official communication document are sufficiently populated, when the predefined portions of the intermediate official communication document are sufficiently populated, electronically add a digital signature and document identification data to the intermediate official communication document to create a finalized official communication document, and output the finalized official communication document to the first party as the request document, and send the request document to the second party from the first party, and where the circuitry is further configured to;

prepare the reply document by the second party prior to receiving the request document from the first party, where the unique requester code of the request document is automatically displayed in the apparatus of the second party via a network or a node connecting the two apparatus, receive a reply request from the second party as the receiver to generate and send the reply document to the first party, extract a document from the database by inputting an input request, the input request including a unique receiver code associated with a predetermined official document stored in the apparatus memory, transform the reply request into a predetermined electronic format, automatically display, responsive to the received reply request, a predetermined official communication document template from among a plurality of predetermined official communication document templates stored in the memory, the predetermined official communication document template having a full or partial amount of text and having a plurality of predefined portions for population with data, the predefined portions usable for adding additional data or changing a part of the text, set the displayed predetermined official communication document template as an intermediate official communication document having the predefined portions for population with data, connect the unique requester code associated with the request document with the unique receiver code associated with the reply document where the unique receiver code comprises the second party account, a document subject, a document name, a document number, a date, a sender or receiver, an electronically readable pattern and the requester code of the request document, determine a mode of operation for the reply document, either a direct option which operates in a fully automatic way without any manual intervention, or an indirect option which operates in a partially automatic way-with manual intervention, when the direct option was determined, setting a mode of operation for each action where a first receiving action is determined to receive the request document from the first party via options including based on time, date and time, or by the mouse and the keyboard, a requesting action is determined to request the reply document from the database via options including with the first receiving action option, by date and time, an option with hiding, or by the mouse and the keyboard, a second receiving action is determined to receive the reply document from the database via options including by date and time, with the requesting action option, an option with hiding the request document, or by the mouse and the keyboard, a sending action is determined to send the reply document to the first party via options including by date and time, with the second receiving action option, after the second receiving action option with duration, or by the mouse and the keyboard, when the indirect option was determined, selecting an option for each of the first and second receiving, requesting and sending actions by manual intervention via the mouse and the keyboard, check prior to sending the reply document to the first party, if the predetermined official communication document has a full amount of text, when the predetermined official communication document has a partial amount of text or change is required, add a key word(s), and/or key sentence(s), determine which data of the reply request with which to populate the predefined portions of the intermediate official communication document, populate a first portion of the predefined portions of the intermediate official communication document with the determined data of the reply request, based on the received reply request, receive data from a database, and populate a second portion of the predefined portions of the intermediate official communication document with data received from the database, determine whether the intermediate official communication document is sufficiently populated with the determined data of the reply request and the data received from the database, when the intermediate official communication document is not sufficiently populated, output a request to the second party to provide additional data to sufficiently populate the predefined portions of the intermediate official communication document, and receive the requested additional data until the predefined portions of the intermediate official communication document are sufficiently populated, when the predefined portions of the intermediate official communication document are sufficiently populated, electronically add a digital signature and document identification data to the intermediate official communication document to create a finalized official communication document, and output the finalized official communication document to the second party as the reply document, and send the reply document to the first party in a determined way from the second party.

2. The apparatus according to claim 1, wherein the electronically readable pattern is one or more of a bar code and a quick read (QR) code, and contains the unique document(s) code(s) and the accounts of the first and second parties.

3. The apparatus according to claim 1, wherein the apparatus automatically manages and generates documents in standardized format with anti-counterfeit measures including a unique bar code, a watermark, or embedded circuitry.

4. The apparatus according to claim 1, wherein when the first party provides the input request via the material inserted in the input port, an electronically readable pattern on the material is scanned to automatically determine the second party account, a soft copy of the material is generated, a code of a first party document automatically connects with a code of a second party document, the reply document is automatically displayed on the apparatus of second party, the request document and the reply document are displayed in one electronic format, and the request document and the reply document are printed and stored as completed official letters.

5. The apparatus according to claim 1, wherein an independent third party is authorized to create an independent account of the first party and an independent account of the second party, and the independent third party can authorize the kind of a communication between the parties based on a formal correspondence between them.

6. The apparatus according to claim 1, wherein the predetermined official communication document, set as an intermediate official communication document, is defined as an official correspondence letter that is written by the user using the keyboard and saved in the memory of the apparatus, said letter having a full amount of text or a partial amount of text, also having a plurality of predefined portions for any change required or for adding additional data, where if the predetermined official document has a full amount of text the document is sent to the first party, and if the predetermined official document has a partial amount of text or the predefined portions are not sufficiently populated a request is automatically output to the user to populate the predefined portions.

7. The apparatus according to claim 6, wherein the predefined portions are part of the text content and have defined by the user for the changeable texts, and when the user received a request from the apparatus to populate the predefined portions the user can input a key word(s), and/or key sentence(s) in the predefined portions and receive data based on the inputted key word(s), and/or key sentence(s), and populate a first portion and a second portion until the document is sufficiently populated.

8. The apparatus according to claim 1, wherein when the first party sets the requesting action option for requesting the request document from the database to a date and time option, and sets the receiving action option for receiving the request document from the database by selecting with the requesting action option, and sets the sending action option for sending the request document to the second party by selecting with the receiving action option, the request document is automatically sent to the second party, in contract, and when the second party sets the first receiving action option for receiving the request document from the first party by selecting on time option, and sets the requesting action option for requesting the reply document from the database by selecting with the first receiving action option, and sets the second receiving action option for receiving the reply document from the database by selecting with the requesting action option, and sets the sending action option for sending the reply document to the first party by selecting with the second receiving action option, the reply document is automatically sent to the first party, and the apparatus of the first party automatically sends the request document and automatically receives the reply document from the apparatus of the second party without any intervention by the first party or the second party.

9. The apparatus according to claim 1, wherein if the reply document was programmed to be automatically sent to the first party at the time of receiving the request document and part of the content of the request document was changed by the first party, the apparatus of the second party identifies the change, cancels the automated sending action, outputs a request to the second party to check the reply document and add additional data in the predefined portions to sufficiently populate and finalize the reply document.

10. The apparatus according to claim 1,
wherein the additional data received in response to the request to the first party or the second party to provide additional data to sufficiently populate the predefined portions of the intermediate official communication document constitutes part of the input request, and
wherein the circuitry is configured to determine whether the intermediate official communication document with the additional data is sufficiently populated and either reject the request or prompt the first party or the second party to provide additional data to sufficiently populate the predefined portions of the intermediate official communication document with the additional data.

11. A method to manage a formal correspondence between at least two parties,
said method implemented using a first communication apparatus by a first party and a second communication apparatus by a second party, where each of the first and second communication apparatus include an input slot to insert a card to identify a user, a keypad to operate a first party account, a display or touch screen display to select a second party account and a set of instructions, a mouse and a keyboard to edit documents, a memory, a circuitry, an input port to insert material, a scanner to generate a soft copy of the inserted material as a first party document, a controller configured to process a soft copy of the inserted material and provide an output reply as a second party document, a printer to print the first party document and the second party document, an output slot to dispense the second party document, and a plurality of bins to store the inserted material,
said method comprising, by the first party and the first apparatus:
receiving an input request from the first party as a requester requesting the first apparatus to generate the request document, the input request including a unique requester code associated with a predetermined official document stored in the memory, where the unique requester code comprises the first party account, a document subject, a document name, a document number, a date, a sender or receiver, an electronically readable pattern and the second party account,
transforming the input request into a predetermined electronic format,
automatically displaying, responsive to the received input request, a predetermined official communication document template from among a plurality of predetermined official communication document templates stored in the memory, the predetermined official communication document template having a full or partial amount of text and having a plurality of predefined portions for population with data, the predefined portions usable for adding additional data or changing a part of the text,
setting the displayed predetermined official communication document template as an intermediate official communication document having the predefined portions for population with data,
determining a mode of operation for the request document, either a direct option which operates in a fully automatic way without any manual intervention, or an indirect option which operates in a partially automatic way with manual intervention,
when the direct option was determined, setting a mode of operation for each action where a requesting action is determined to request the request document from database via options including by date and time, and by the mouse and the keyboard and, a receiving action is determined to receive the request document from the database via options including with the requesting action, by date and time, an option with hiding, and by the mouse and the keyboard, a sending action is determined to send the request document to the second party via options including by date and time, with the receiving action, after the receiving action with duration, an option without linking the previous document, and by the mouse and the keyboard,
when the indirect option was determined, selecting an option for each of the requesting, receiving and sending actions by manual intervention via the mouse and the keyboard,
checking prior to sending the request document to the second party, if the predetermined official communication document has a full amount of text,
when the predetermined official communication document has a partial amount of text or change is required, adding a key word(s), and/or key sentence(s) by the first party,
determining which data of the input request with which to populate the predefined portions of the intermediate official communication document,
populating a first portion of the predefined portions of the intermediate official communication document with the determined data of the input request,
based on the received input request, receiving data from a database, and populating a second portion of the predefined portions of the intermediate official communication document with data received from the database,
determining whether the intermediate official communication document is sufficiently populated with the determined data of the input request and the data received from the database, wherein the intermediate official communication document is sufficiently populated when all of the predefined portions of the intermediate official communication document are populated, when the intermediate official communication document is not sufficiently populated, outputting a request to the first party to provide additional data to sufficiently populate the predefined portions of the intermediate official communication document, and receiving the requested additional data until the predefined portions of the intermediate official communication document are sufficiently populated, when the predefined portions of the intermediate official communication document are sufficiently populated, electronically adding a digital signature and document identification data to the intermediate official communication document to create a finalized official communication document, and outputting the finalized official communication document to the first party as the request document, and sending the request document to the second party from the first party;

said method further comprising, by the second party and the second apparatus;

receiving a reply request from the second party as the receiver to generate and send the reply document to the first party, extracting a document from the database by inputting the reply request, the reply request including a unique receiver code associated with a predetermined official document stored in the apparatus memory, transforming the reply request into a predetermined electronic format, automatically displaying, responsive to the received reply request, a predetermined official communication document template from among a plurality of predetermined official communication document templates stored in the memory, the predetermined official communication document template having a full or partial amount of text and having a plurality of predefined portions for population with data, the predefined portions usable for adding additional data or changing a part of the text, setting the displayed predetermined official communication document template as an intermediate official communication document having the predefined portions for population with data, connecting the unique requester code associated with the request document with the unique receiver code associated with the reply document where the unique receiver code comprises the second party account, a document subject, a document name, a document number, a date, an electronically readable pattern and the requester code of the request document, determining a mode of operation for the reply document, either a direct option which operates in a fully automatic way without any manual intervention, or an indirect option which operates in a partially automatic way with manual intervention, when the direct option was determined, setting a mode of operation for each action where a first receiving action is determined to receive the request document from the first party via options including based on time, date and time, or by the mouse and the keyboard, a requesting action is determined to request the reply document from the database via options including with the first receiving action option, by date and time, an option with hiding, or by the mouse and the keyboard, a second receiving action is determined to receive the reply document from the database via options including by date and time, with the requesting action option, an option with hiding the request document, or by the mouse and the keyboard, a sending action is determined to send the reply document to the first party via options including by date and time, with the second receiving action option, after the second receiving action option with duration, or by the mouse and the keyboard, when the indirect option was determined, selecting an option for each of the first and second receiving, requesting and sending actions by manual intervention via the mouse and the keyboard, checking prior to sending the reply document to the first party, if the predetermined official communication document has a full amount of text, when the predetermined official communication document has a partial amount of text or change is required, adding a key word(s), and/or key sentence(s) by the second party, determining which data of the reply request with which to populate the predefined portions of the intermediate official communication document, populating a first portion of the predefined portions of the intermediate official communication document with the determined data of the reply request, based on the received reply request, receiving data from a database, and populating a second portion of the predefined portions of the intermediate official communication document with data received from the database, determining whether the intermediate official communication document is sufficiently populated with the determined data of the reply request and the data received from the database, when the intermediate official communication document is not sufficiently populated, outputting a request to the second party to provide additional data to sufficiently populate the predefined portions of the intermediate official communication document, and receiving the requested additional data until the predefined portions of the intermediate official communication document are sufficiently populated, when the predefined portions of the intermediate official communication document are sufficiently populated, electronically adding a digital signature and document identification data to the intermediate official communication document to create a finalized official communication document, and outputting the finalized official communication document to the second party as the reply document, and sending the reply document to the first party.

12. The method according to claim 11, wherein the unique requester code associated with the first party document is used to create the unique receiver code associated with the second party document where the two documents are connected together.

13. The method according to claim 11, wherein the first party document and the second party document are linked to each other, the request document automatically extracts the reply document from the memory of the second party apparatus and displays the request and reply documents to the second party, and the reply document automatically extracts the request document from the memory of the first party apparatus and displays the request and reply documents to the first party.

14. The method according to claim 11, further comprising preparing the reply document prior to receiving the request document from the first party, where the unique requester code of the request document is automatically displayed in the second apparatus via a network or a node connecting the first and second apparatus.

15. The method according to claim 11, wherein the predetermined official document of the first party is automatically identified and extracted to the first party after inputting the unique requester code in the input request, and the reply predetermined document of the second party is automatically identified and extracted to the second party after inputting the unique receiver code in the input request, and when the request document is linked with the reply document, both documents are displayed to the user after at least one of the two codes is entered in the input request.

16. The method according to claim 11, wherein three or more documents for one subject matter are linked between the first party with the first apparatus and the second party with the second apparatus, and automatically displayable to either party, where a document code is used to link each document to a subsequent document which is created in response thereto.

17. The method according to claim 11, wherein additional documents for one subject matter are linked between additional parties each with an apparatus, and additional options are determined for the requesting, receiving and sending actions based on contingencies to the additional documents and parties.

18. A computer program product implemented on non-transitory computer readable media of a first communication apparatus used by a first party and a second communication apparatus used by a second party, where each of the first and second communication apparatus include an input slot to insert a card to identify a user, a keypad to operate a first party account, a display or touch screen display to select a second party account and a set of instructions, a mouse and a keyboard to edit documents, a memory, a circuitry, an input port to insert material, a scanner to generate a soft copy of the inserted material as a first party document, a controller configured to process a soft copy of the inserted material and provide an output reply as a second party document, a printer to print the first party document and the second party document, an output slot to dispense the second party document, and a plurality of bins to store the inserted material, said computer program product being configured for use by the first party and the first apparatus to perform steps comprising:

receiving an input request from the first party as a requester requesting the first apparatus to generate the request document, the input request including a unique requester code associated with a predetermined official document stored in the memory, where the unique requester code comprises the first party account, a document subject, a document name, a document number, a date, a sender or receiver, an electronically readable pattern and the second party account, transforming the input request into a predetermined electronic format, automatically displaying, responsive to the received input request, a predetermined official communication document template from among a plurality of predetermined official communication document templates stored in the memory, the predetermined official communication document template having a full or partial amount of text and having a plurality of predefined portions for population with data, the predefined portions usable for adding additional data or changing a part of the text, setting the displayed predetermined official communication document template as an intermediate official communication document having the predefined portions for population with data, determining a mode of operation for the request document, either a direct option which operates in a fully automatic way without any manual intervention, or an indirect option which operates in a partially automatic way with manual intervention, when the direct option was determined, setting a mode of operation for each action where a requesting action is determined to request the request document from database via options including by date and time, and by the mouse and the keyboard and, a receiving action is determined to receive the request document from the database via options including with the requesting action, by date and time, an option with hiding, and by the mouse and the keyboard, a sending action is determined to send the request document to the second party via options including by date and time, with the receiving action, after the receiving action with duration, an option without linking the previous document, and by the mouse and the keyboard, when the indirect option was determined, selecting an option for each of the requesting, receiving and sending actions by manual intervention via the mouse and the keyboard, checking prior to sending the request document to the second party, if the predetermined official communication document has a full amount of text, when the predetermined official communication document has a partial amount of text or change is required, adding a key word(s), and/or key sentence(s) by the first party, determining which data of the input request with which to populate the predefined portions of the intermediate official communication document, populating a first portion of the predefined portions of the intermediate official communication document with the determined data of the input request, based on the received input request, receiving data from a database, and populating a second portion of the predefined portions of the intermediate official communication document with data received from the database, determining whether the intermediate official communication document is sufficiently populated with the determined data of the input request and the data received from the database, wherein the intermediate official communication document is sufficiently populated when all of the predefined portions of the intermediate official communication document are populated, when the intermediate official communication document is not sufficiently populated, outputting a request to the first party to provide additional data to sufficiently populate the predefined portions of the intermediate official communication document, and receiving the requested additional data until the predefined portions of the intermediate official communication document are sufficiently populated, when the predefined portions of the intermediate official communication document are sufficiently populated, electronically adding a digital signature and document identification data to the intermediate official communication document to create a finalized official communication document, and outputting the finalized official communication document to the first party as the request document, and sending the request document to the second party from the first party;

said computer program product being configured for use by the second party and the second apparatus to perform steps comprising:

receiving a reply request from the second party as the receiver to generate and send the reply document to the first party, extracting a document from the database by inputting the reply request, the reply request including a unique receiver code associated with a predetermined official document stored in the apparatus memory, transforming the reply request into a predetermined electronic format, automatically displaying, responsive to the received reply request, a predetermined official communication document template from among a plurality of predetermined official communication document templates stored in the memory, the predetermined official communication document template having a full or partial amount of text and having a plurality of predefined portions for population with data, the predefined portions usable for adding additional data or changing a part of the text, setting the displayed predetermined official communication document template as an intermediate official communication document having the predefined portions for population with data, connecting the unique requester code associated with the request document with the unique receiver code associated with the reply document where the unique receiver code comprises the second party account, a document subject, a document name, a document number, a date, an electronically readable pattern and the requester code of the request document, determining a mode of operation for the reply document, either a direct option which operates in a fully automatic way without any manual intervention, or an indirect option which operates in a partially automatic way with manual intervention, when the direct option was determined, setting a mode of operation for each action where a first receiving action is determined to receive the request document from the first party via options including based on time, date and time, or by the mouse and the keyboard, a requesting action is determined to request the reply document from the database via options including with the first receiving action option, by date and time, an option with hiding, or by the mouse and the keyboard, a second receiving action is determined to receive the reply document from the database via options including by date and time, with the requesting action option, an option with hiding the request document, or by the mouse and the keyboard, a sending action is determined to send the reply document to the first party via options including by date and time, with the second receiving action option, after the second receiving action option with duration, or by the mouse and the keyboard, when the indirect option was determined, selecting an option for each of the first and second receiving, requesting and sending actions by manual intervention via the mouse and the keyboard, checking prior to sending the reply document to the first party, if the predetermined official communication document has a full amount of text, when the predetermined official communication document has a partial amount of text or change is required, adding a key word(s), and/or key sentence(s) by the second party, determining which data of the reply request with which to populate the predefined portions of the intermediate official communication document, populating a first portion of the predefined portions of the intermediate official communication document with the determined data of the reply request, based on the received reply request, receiving data from a database, and populating a second portion of the predefined portions of the intermediate official communication document with data received from the database, determining whether the intermediate official communication document is sufficiently populated with the determined data of the reply request and the data received from the database, when the intermediate official communication document is not sufficiently populated, outputting a request to the second party to provide additional data to sufficiently populate the predefined portions of the intermediate official communication document, and receiving the requested additional data until the predefined portions of the intermediate official communication document are sufficiently populated, when the predefined portions of the intermediate official communication document are sufficiently populated, electronically adding a digital signature and document identification data to the intermediate official communication document to create a finalized official communication document, and outputting the finalized official communication document to the second party as the reply document, and sending the reply document to the first party.

* * * * *